(12) United States Patent
Makuta et al.

(10) Patent No.: US 8,197,051 B2
(45) Date of Patent: *Jun. 12, 2012

(54) INK JET RECORDING INK SET AND INK JET IMAGE RECORDING METHOD

(75) Inventors: Toshiyuki Makuta, Ashigarakami-gun (JP); Masaaki Konno, Ashigarakami-gun (JP); Tetsuzo Kadomatsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 11/886,914

(22) PCT Filed: Mar. 31, 2006

(86) PCT No.: PCT/JP2006/307408
§ 371 (c)(1), (2), (4) Date: Sep. 21, 2007

(87) PCT Pub. No.: WO2006/104284
PCT Pub. Date: Oct. 5, 2006

(65) Prior Publication Data
US 2009/0073246 A1 Mar. 19, 2009

(30) Foreign Application Priority Data

Mar. 31, 2005 (JP) ................................. 2005-105148
Mar. 31, 2005 (JP) ................................. 2005-105151
Mar. 31, 2005 (JP) ................................. 2005-105207
Sep. 30, 2005 (JP) ................................. 2005-289363

(51) Int. Cl.
*G01D 11/00* (2006.01)

(52) U.S. Cl. ............... 347/100; 347/96; 347/95; 347/98; 347/102

(58) Field of Classification Search ............ 347/95–102; 106/31.13, 31.27, 31.6; 523/160, 161
See application file for complete search history.

(56) References Cited

U.S. PATENT DOCUMENTS

| | | | |
|---|---|---|---|
| 4,303,924 A | 12/1981 | Young, Jr. | |
| 4,878,946 A | 11/1989 | Tabayashi et al. | |
| 5,804,301 A * | 9/1998 | Curatolo | 428/352 |
| 5,948,512 A | 9/1999 | Kubota et al. | |
| 5,981,113 A * | 11/1999 | Christian | 430/9 |
| 6,521,031 B2 | 2/2003 | Kimura et al. | |
| 6,543,888 B2 * | 4/2003 | Nishita | 347/98 |
| 6,550,903 B2 * | 4/2003 | Katsuragi et al. | 347/96 |
| 8,011,776 B2 * | 9/2011 | Makuta et al. | 347/100 |
| 2002/0067399 A1 * | 6/2002 | Yabuki et al. | 347/100 |
| 2002/0140790 A1 * | 10/2002 | Moriyama et al. | 347/96 |
| 2003/0021961 A1 | 1/2003 | Ylitalo et al. | |
| 2003/0069329 A1 | 4/2003 | Kubota et al. | |
| 2003/0085974 A1 | 5/2003 | Shimomura et al. | |
| 2003/0199609 A1 | 10/2003 | Yamanouchi et al. | |
| 2006/0012627 A1 | 1/2006 | Nakazawa et al. | |
| 2006/0176349 A1 * | 8/2006 | Nagai et al. | 347/100 |

FOREIGN PATENT DOCUMENTS

| | | |
|---|---|---|
| EP | 1125760 A1 | 8/2001 |
| JP | 63-060783 A | 3/1988 |
| JP | 5-214279 A | 8/1993 |
| JP | 8-174997 A | 7/1996 |
| JP | 9-067536 | 3/1997 |
| JP | 10-287035 A | 10/1998 |
| JP | 2001-115067 A | 4/2001 |
| JP | 2001-348519 A | 12/2001 |
| JP | 2002-225415 A | 8/2002 |
| JP | 2002332434 A | 11/2002 |
| JP | 2003-012971 A | 1/2003 |
| JP | 3478495 B | 10/2003 |
| JP | 2005096254 A * | 4/2005 |
| WO | 02/085638 A1 | 10/2002 |

OTHER PUBLICATIONS

Koichi Nakano, Notice of Reason for Rejection, Mar. 21, 2012.

* cited by examiner

*Primary Examiner* — Matthew Luu
*Assistant Examiner* — Rut Patel
(74) *Attorney, Agent, or Firm* — Sheldon J. Moss; Chad M. Herring

(57) ABSTRACT

Disclosed are an ink jet recording ink set which is suppressed in bleeding and shot droplet interference and can form a high quality image and an ink jet image recording method. The ink jet recording ink set has plural liquids including at least a first liquid and a second liquid. The second liquid contains a polymerizable compound and the first liquid contains a high-boiling point organic solvent and the high-boiling organic solvent meets any one of the following requirements (A) to (C) and an ink jet image recording method includes supplying a first and a second liquid simultaneously or sequentially to a recording medium such that both liquids are in contact with each other, to form an image: (A) it has a viscosity of 100 mPa·s or less at 25° C. and a viscosity of 30 mPa·s or less at 60° C. and has a boiling point of 100° C. or higher, (B) it is represented by the following formula (I), and (C) it is represented by the following formula (II):

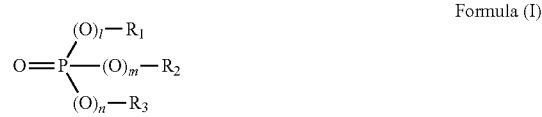

Formula (I)

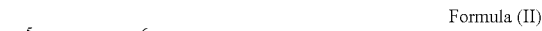

Formula (II)

7 Claims, No Drawings

INK JET RECORDING INK SET AND INK JET IMAGE RECORDING METHOD

TECHNICAL FIELD

The present invention relates to an ink jet recording ink set and to an ink jet image recording method, and particularly, to an ink jet recording ink set capable of forming a high quality image and to a multi-liquid aggregation type ink jet image recording method using this ink jet recording ink set.

BACKGROUND ART

An ink jet system that ejects ink from an ink jetting port such as a nozzle is used in many printers for the reason that it is small-sized and inexpensive and it can form an image without contact between the ink jet system and a printing medium. Among these ink jet systems, a piezo ink jet system that utilizes the deformation of a piezo element to jet ink and a thermal ink jet system that utilizes a boiling phenomenon of ink which is caused by thermal energy have high resolution and high-speed printing ability.

Currently, it is important tasks to attain high-speed printing and high image quality when printing an image on a non-water-absorptive recording medium such as plain paper or plastics by an ink jet printer. In particular, if it takes time to dry printed ink droplets, this easily causes image blurring, and causes adjacent ink droplets to undesirably mix with each other and, therefore, shot droplet interference occurs. These hinder the formation of a fresh and sharp image. Moreover, when images are printed on non-water-absorptive recording media, on which drying of a solvent is very slowly, it becomes necessary to dry media on which images have been recorded without piling the media immediately after printing. Here, the shot droplet interference is a phenomenon in which adjacent shot droplets aggregate into one droplet to decrease the surface energy of these droplets (decrease surface area). When adjacent liquid droplets aggregate, these liquid droplets shift from their original positions, where the droplets reach the medium. When fine lines are drawn using ink containing a colorant, the resultant lines have non-uniform widths. When a plane is drawn using such ink, the resultant plane has unevenness.

To promote curing of ink and suppress the blurring of an image and shot droplet interference, an ink for ink jet was proposed which solidifies not by volatilization of an ink solvent but by curing due to radiation (see, for example, Japanese Patent Application Laid-Open (JP-A) No. 5-214279). However, because a pigment dispersion is used as the colorant of the ink, a nozzle is clogged by aggregation of the pigments and it is therefore difficult to eject ink stably.

To address this problem, an ultraviolet ray-curable ink including a dye, rather than a pigment, as the colorant thereof is disclosed in order to form an image superior in transparency and tone (see, for example, U.S. Pat. No. 4,303,924). However, this ink tends to cause an undesirable polymerization reaction during storage, and has unsatisfactory storage stability. Also, this ink further contains an electrically conductive salt, which may have poor solubility in the ink. Therefore, when the ink is stored for a long period of time, such a salt may precipitate, resulting in printing failures.

Techniques using ink including two liquids to react these liquids with each other on a recording medium were proposed for the purpose of achieving both storability and high-speed drying characteristics. Specifically, a method in which a solution containing a basic polymer is adhered to a recording medium and an ink containing an anionic dye is then adhered thereto (see, for example, JP-A No. 63-60783), a method in which a liquid composition containing a cationic material is applied to a recording medium and an ink containing an anionic compound and a colorant is applied thereto (see, for example, JP-A No. 8-174997), and a method in which a set of an ink including a photo-curable resin and another ink including a photo-polymerization initiator is used (see, for example, Japanese Patent No. 3,478,495) are disclosed. However, these methods are intended to suppress bleeding of an image due to the precipitation of a dye and cannot suppress the shot droplet interference. In addition, because the ink contains an aqueous solvent, it therefore dries slowly. Moreover, the dye unevenly precipitates on the recording medium, which may cause deterioration in image quality.

Accordingly, there is a need for an ink jet recording ink set which retains long-term storability and excellent fixing ability, and is suppressed in bleeding and shot droplet interference between adjacent jetted ink droplets, and makes it possible to form a high quality image.

There is also a need for an ink jet image recording method which retains excellent fixing ability, and is suppressed in bleeding and shot droplet interference between adjacent jetted ink droplets, and makes it possible to form a high quality image.

DISCLOSURE OF INVENTION

A first aspect of the invention provides an ink jet recording ink set containing plural liquids including at least a first liquid and a second liquid, wherein the second liquid contains a polymerizable compound and the first liquid contains a high-boiling point organic solvent which has a viscosity of 100 mPa·s or less at 25° C. or a viscosity of 30 mPa·s or less at 60° C. and a boiling point of 100° C. or higher.

A second aspect of the invention provides an ink jet recording ink set containing plural liquids including at least a first liquid and a second liquid, wherein the second liquid contains a polymerizable compound and the first liquid contains a high-boiling point organic solvent represented by the following formula (I):

Formula (I)

wherein $R_1$, $R_2$ and $R_3$ independently represent an aliphatic group or an aryl group; two of $R_1$, $R_2$ and $R_3$ may bond to each other to form a ring; and l, m, and n independently denote 0 or 1.

A third aspect of the invention provides an ink jet recording ink set containing plural liquids including at least a first liquid and a second liquid, wherein the second liquid contains a polymerizable compound and the first liquid contains a high-boiling point organic solvent represented by the following formula (II):

Formula (II)

wherein $R_5$ and $R_6$ independently represent a substituted or unsubstituted alkyl group, a substituted or unsubstituted cycloalkyl group, a substituted or unsubstituted alkenyl group, a substituted or unsubstituted aryl group or a substituted or unsubstituted heterocyclic group.

A fourth aspect of the invention provides an ink jet image recording method, including using any one of the ink jet recording ink sets containing plural liquids containing at least a first liquid and a second liquid according to the first to third aspects and applying the first liquid and the second liquid on a recording medium simultaneously or sequentially such that both liquids are in contact with each other to form an image.

BEST MODE FOR CARRYING OUT THE INVENTION

The ink jet recording ink set of the invention (hereinafter, simply referred to as "ink set of the invention" in some cases) essentially contains plural liquids including at least a first liquid and a second liquid, and the second liquid contains a polymerizable compound and the first liquid contains a high-boiling point organic solvent.

The ink jet recording ink set may have a viscosity of 100 mPa·s or less at 25° C. or a viscosity of 30 mPa·s or less at 60° C. and a boiling point of 100° C. or higher. Hereinafter, this type of ink jet recording ink set is referred to as a "first ink set" in some cases.

Moreover, the ink jet recording ink set may have a high-boiling point organic solvent represented by the following formula (I).

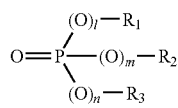

Formula (I)

In the formula, $R_1$, $R_2$ and $R_3$ independently represent an aliphatic group or an aryl group, and two of $R_1$, $R_2$ and $R_3$ may bond to each other to form a ring and l, m, and n independently denote 0 or 1.

Hereinafter, this type of ink jet recording ink set is referred to as a "second ink set" in some cases.

Further, the ink jet recording ink set may have a high-boiling point organic solvent represented by the following formula (II):

Formula (II)

In the formula, $R_5$ and $R_6$ independently represent a substituted or unsubstituted alkyl group, a substituted or unsubstituted cycloalkyl group, a substituted or unsubstituted alkenyl group, a substituted or unsubstituted aryl group or a substituted or unsubstituted heterocyclic group.

Hereinafter, this type of ink jet recording ink set is referred to as a "third ink set" in some cases.

The application of the first liquid containing a high-boiling point organic solvent and the second liquid containing a polymerizable compound makes it possible to effectively suppress bleeding and shot droplet interference.

In the ink jet image recording method of the invention, either of the first liquid and the second liquid may be applied first to a recording medium or both may be applied simultaneously. However, in the case where at least one colorant is contained in either of these liquids, the colorant(s) is preferably contained in the liquid provided second. The reason for this is as follows. In the case of a method in which the first and second liquids of the two-liquid-type ink set are sequentially ejected by an ink jet system, the liquid ejected first is brought into direct contact with a recording medium and, therefore, causes shot droplet interference. Here, a visible ink component is a colorant. When a liquid including a colorant causes shot droplet interference, the shot droplet interference is visible and results in deteriorated image quality.

In the invention, as will be mentioned later, it is preferable that the first liquid is first applied to a recording medium. Therefore, in this case, the colorant is preferably contained in the second liquid. Moreover, preferably, the colorant is not substantially contained in the first liquid.

In the invention, at least one of the plural liquids (including the first liquid and second liquid) of the ink set of the invention preferably contains a polymerization initiator that starts curing of the polymerizable compound. The polymerization initiator is preferably contained in the liquid including no polymerizable compound from the viewpoint of the storage stability of the liquid.

In the invention, if a low-boiling point solvent (boiling point of 100° C. or lower) is contained in the plural liquids as the solvent thereof, the low-boiling point solvent may adversely affect the curing property of the polymerizable compound. Alternatively, if a water-soluble solvent is contained in the plural liquids as the solvent thereof, it takes time to evaporate the solvent, and an ink containing such plural liquids cannot be rapidly dried in some cases. Therefore, it is preferable that the plural liquids do not contain the low-boiling point solvent and/or the water-soluble solvent.

In the following detailed explanations of the invention, the components of the plural liquids will be described first.

<High-Boiling Point Organic Solvent>

First, the high-boiling point organic solvent used in the invention will be explained.

In the invention, it is essential requirements that the second liquid contains a polymerizable compound which will be explained later and that the first liquid contains a high-boiling point organic solvent. A combination of a liquid containing a polymerizable compound and another liquid containing a high-boiling point organic solvent can prevent occurrence of bleeding and shot droplet interference.

The high-boiling point organic solvent may be contained in both the first and second liquids and may be contained in other liquid(s) among the plural liquids.

Hereinafter, the high-boiling point organic solvent in each of the first ink set, the second ink set and the third ink set will be explained in detail. In the following explanations, the high-boiling point organic solvent contained in the first ink set is called a "first high-boiling point organic solvent", and the high-boiling point organic solvent contained in the second ink set is called a "second high-boiling point organic solvent" and the high-boiling point organic solvent contained in the third ink set is called a "third high-boiling point organic solvent".

—First High-Boiling Point Organic Solvent—

The first high-boiling point organic solvent contained in the first ink set is characterized in that it has (1) a viscosity of 100 mPa·s or less at 25° C. or a viscosity of 30 mPa·s or less at 60° C. and (2) a boiling point of 100° C. or higher. A high-boiling point organic solvent that satisfies neither of the viscosity requirements (1) results in an ink set having an increased viscosity, which hinders the application of the ink set to a recording medium. On the other hand, a high-boiling point organic solvent that does not satisfy the boiling point requirement (2) has a too low boiling point, and vaporizes during image formation and eventually, the effect of avoiding shot droplet interference for which the invention is intended is not obtained. Moreover, a measure to prevent gas generated by the vaporization of the solvent from diffusing in the air is necessary to preserve environment.

In the requirement (1), the viscosity of the first high-boiling point organic solvent at 25° C. is preferably 70 mPa·s or less, more preferably 40 mPa·s or less and still more preferably 20 mPa·s. The viscosity thereof at 60° C. is preferably 20 mPa·s or less and more preferably 10 mPa·s or less. The boiling point of the first high-boiling point organic solvent is preferably 150° C. or higher and more preferably 170° C. or higher. In addition, the first high-boiling point organic solvent preferably has a melting point of 80° C. or lower and a solubility of water of 4 g or less at 25° C. The solubility of water in the first high-boiling point organic solvent in water is more preferably 3 g or less, still more preferably 2 g or less and most preferably 1 g or less.

Here, the "viscosity" in the invention is measured with a RE 80-type viscometer manufactured by Toki Sangyo Co., Ltd. The RE-80 type viscometer is a plate-type one having conical rotors and corresponding to the E-type one, and a rotor having a rotor code No. 1 is used at a rotation speed of 10 rpm in the measurement. When a sample has a viscosity higher than 60 mPa·s, the viscosity of the sample is measured at a changed rotation speed, for example, 5 rpm, 2.5 rpm, 1 rpm or 0.5 rpm.

Also, the "solubility of water" in the invention is the saturated concentration of water in the high-boiling point organic solvent at 25° C. and specifically means the mass (g) of water that can be dissolved in the high-boiling point organic solvent at 25° C.

The first high-boiling point organic solvent is preferably at least one of compounds represented by the following formulae [S-1] to [S-9].

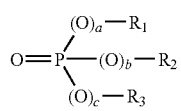
Formula (S-1)

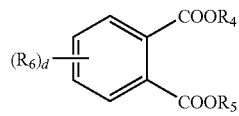
Formula (S-2)

Formula (S-3)

Formula (S-4)

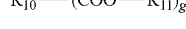
Formula (S-5)

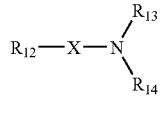
Formula (S-6)

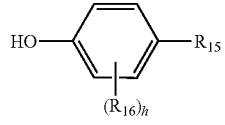
Formula (S-7)

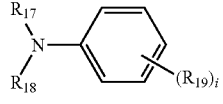
Formula (S-8)

Formula (S-9)

In formula [S-1], $R_1$, $R_2$ and $R_3$ independently represent an aliphatic group or an aryl group. Two of $R_1$, $R_2$ and $R_3$ may bond to each other to form a ring. a, b and c independently denote 0 or 1.

In formula [S-2], $R_4$ and $R_5$ independently represent an aliphatic group or an aryl group, and $R_6$ represents a halogen atom (i.e., F, Cl, Br or I), an alkyl group, an alkoxy group, an aryloxy group, an alkoxycarbonyl group or an aryloxycarbonyl group and d denotes an integer from 0 to 3. When d is 2 or more, plural $R_6$s may be the same or different. Hereinafter, halogen atoms in this specification mean F, Cl, Br or I.

In formula [S-3], Ar represents an aryl group, e denotes an integer from 1 to 6 and $R_7$ represents a hydrocarbon group having a valence of e or a group which has a valence of e and in which hydrocarbon groups are bonded to each other via an ether bond.

In formula [S-4], $R_8$ represents an aliphatic group, f denotes an integer from 1 to 6 and $R_9$ represents a hydrocarbon group having a valence of f or a group which has a valence of f and in which hydrocarbon groups are bonded to each other via an ether bond.

In formula [S-5], g denotes an integer from 2 to 6, $R_{10}$ represents a hydrocarbon group (excluding an aryl group) having a valence of g and $R_{11}$ represents an aliphatic group or an aryl group.

In formula [S-6], $R_{12}$, $R_{13}$ and $R_{14}$ independently represent a hydrogen atom, an aliphatic group or an aryl group. X represents —CO— or —SO$_2$—. $R_{12}$ and $R_{13}$, or $R_{13}$ and $R_{14}$ may bond to each other to form a ring.

In formula [S-7], $R_{15}$ represents an aliphatic group, an alkoxycarbonyl group, an aryloxycarbonyl group, an alkylsulfonyl group, an arylsulfonyl group, an aryl group or a cyano group, $R_{16}$ represents a halogen atom, an aliphatic group, an aryl group, an alkoxy group or an aryloxy group and h denotes an integer from 0 to 3. When h is 2 or more, plural $R_{16}$s may be the same or different.

In formula [S-8], $R_{17}$ and $R_{18}$ independently represent an aliphatic group or an aryl group and $R_{19}$ represents a halogen atom, an aliphatic group, an aryl group, an alkoxy group or an aryloxy group and i denotes an integer from 0 to 5. When i is 2 or more, plural $R_{19}$s may be the same or different.

In formula [S-9], $R_{20}$ and $R_{21}$ independently represent an aliphatic group or an aryl group. i denotes 1 or 2. $R_{20}$ and $R_{21}$ may bond to each other to form a ring.

When at least one of $R_1$ to $R_6$, $R_8$ and $R_1$ to $R_{21}$ in formulae [S-1] to [S-9] is an aliphatic group or contains at least one aliphatic group as its substituent(s), the aliphatic group(s) may be a linear, branched or cyclic group, and may contain at least one unsaturated bond or may have at least one substituent. Examples of the substituent include a halogen atom, an aryl group, an alkoxy group, an aryloxy group, an alkoxycarbonyl group, a hydroxyl group, an acyloxy group and an epoxy group.

In this case, the substituent in formula [S-1] can also be a phosphate residual group, a phosphite residual group, a hypophosphite residual group or a phosphine oxide residual group obtained by removing $R_1$ from formula [S-1].

When at least one of $R_1$ to $R_6$, $R_8$ and $R_{11}$ to $R_{21}$ is a cycloaliphatic group, namely, a cycloalkyl group, or contains at least one cycloalkyl group as its substituent(s), the cycloalkyl group is preferably a three to eight-membered ring, may contain at least one unsaturated bond and may have at least one substituent and/or at least one cross-linkable group. Examples of the substituent include a halogen atom, an aliphatic group, a hydroxyl group, an acyl group, an aryl group, an alkoxy group, an aryloxy group, an alkoxycarbonyl group, an acyloxy group and an epoxy group. Examples of the cross-linkable group include methylene, ethylene and isopropylidene.

In this case, the substituent in formula [S-1] can also be a phosphate residual group, a phosphite residual group, a hypophosphite residual group or a phosphine oxide residual group obtained by removing $R_1$ from formula [S-1].

When at least one of $R_1$ to $R_6$, $R_8$, $R_{11}$ to $R_{21}$ and Ar is an aryl group or contains an aryl group as its substituent, the aryl group may have at least one substituent such as a halogen atom, an aliphatic group, an aryl group, an alkoxy group, an aryloxy group, an alkoxycarbonyl group or an acyloxy group.

In this case, the substituent in formula [S—I] can also be a phosphate residual group, a phosphite residual group, a hypophosphite residual group or a phosphine oxide residual group obtained by removing $R_1$ from formula [S-1].

The ring formed by a combination of two of $R_1$, $R_2$ and $R_3$ may contain at least one heteroatom such as an oxygen atom, nitrogen atom and sulfur atom therein.

When $R_7$, $R_9$ or $R_{10}$ is a hydrocarbon group in formulae [S-3], [S-4] and [S-5], the hydrocarbon group may have a cyclic structure (e.g., a benzene ring, a cyclopentane ring or a cyclohexane ring), may contain at least one unsaturated bond or may have at least one substituent. Examples of the substituent include a halogen atom, a hydroxyl group, an acyloxy group, an aryl group, an alkoxy group, an aryloxy group and an epoxy group.

Particularly preferable high-boiling point organic solvents among the high-boiling organic solvents represented by formulae [S-1] to [S-9] will be explained.

In formula [S-1], each of $R_1$, $R_2$ and $R_3$ is preferably an aliphatic group having 1 to 24 (preferably 4 to 18) carbon atoms or an alicyclic group having 5 to 24 (preferably 6 to 18) carbon atoms (e.g., ethyl, n-butyl, n-hexyl, n-octyl, EH-octyl, 2-ethylhexyl, 3,3,5-trimethylhexyl, 3,5,5-trimethylhexyl, n-nonyl, i-nonyl, n-decyl, n-dodecyl, n-tetradecyl, n-hexadecyl, n-octadecyl, benzyl, oleyl, 2-chloroethyl, 2,3-dichloropropyl, 2-butoxyethyl, 2-phenoxyethyl, cyclopentyl, cyclohexyl, 2-cyclohexenyl, 4-t-butylcyclohexyl and 4-methylcyclohexyl groups), or an aryl group having 6 to 24 (preferably 6 to 18) carbon atoms (e.g., phenyl, naphthyl, cresyl, p-nonylphenyl, xylyl, cumenyl, p-methoxyphenyl, p-methoxycarbonylphenyl and chlorophenyl groups). Each of $R_1$, $R_2$ and $R_3$ is more preferably an ethyl group, a n-butyl group, a n-hexyl group, a n-octyl group, an EH-octyl group, a 2-ethylhexyl group, a 3,5,5-trimethylhexyl group, a n-nonyl group, an i-nonyl group, a n-decyl group, a n-dodecyl group, a n-tetradecyl group, a n-hexadecyl group, a n-octadecyl group, an oleyl group, a 2-chloroethyl group, a 2-butoxyethyl group, a 2-phenoxyethyl group, a cyclohexyl group, a phenyl group, a cresyl group, a xylyl group, a p-nonylphenyl group, a cumenyl group, a chlorophenyl group, a naphthyl group or a p-methoxyphenyl group, and most preferably a n-butyl group, a n-hexyl group, a n-octyl group, a 2-ethylhexyl group, a 3,5,5-trimethylhexyl group, a n-decyl group, a n-dodecyl group, a 2-chloroethyl group, a 2-butoxyethyl group, a cyclohexyl group, a phenyl group, a cresyl group, a p-nonylphenyl group, a xylyl group, a cumenyl group or a chlorophenyl group.

Also, the phosphate residual group, phosphite residual group, hypophosphite residual group or phosphine oxide residual group obtained by removing $R_1$ from formula [S-1] is preferably the following.

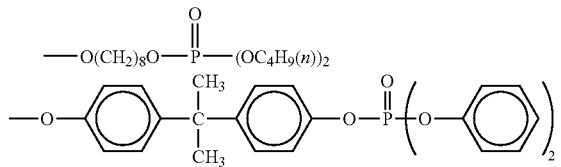

In the case where two of $R_1$, $R_2$ and $R_3$ bond to each other to form a ring, the ring is preferably a three- to twelve-membered ring (more preferably a five- to ten-membered ring), and each of the heteroatoms contained in the ring is preferably an oxygen atom, a nitrogen atom, a sulfur atom or a phosphorous atom, more preferably an oxygen atom or a nitrogen atom and still more preferably an oxygen atom.

Each of a, b and c is 0 or 1. Preferably, all of a, b and c are 1.

Each of $R_4$ and $R_5$ in formula [S-2] is preferably an aliphatic group having 1 to 24 (preferably 4 to 18) carbon atoms (for example, those the same as the exemplary groups of the aliphatic group serving as $R_1$, and heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl and 1-methylcyclohexyl groups), or an aryl group having 6 to 24 (preferably 6 to 18) carbon atoms (for example, those the same as the exemplary groups of the aryl group serving as $R_1$, and 4-t-butylphenyl, 4-t-octylphenyl, 1,3,5-trimethylphenyl, 2,4-di-t-butylphenyl and 2,4-di-t-pentylphenyl groups). Each of $R_4$ and $R_5$ is more preferably an aliphatic group and still more preferably a n-butyl group, a heptyl group, a 2-ethylhexyl group, a n-dodecyl group, a 2-butoxyethyl group or an ethoxycarbonylmethyl group.

$R_6$ is preferably a halogen atom (preferably a chlorine atom), an alkyl group having 1 to 18 carbon atoms (e.g., methyl, isopropyl, t-butyl and n-dodecyl groups), an alkoxy group having 1 to 18 carbon atoms (e.g., methoxy, n-butoxy, n-octyloxy, methoxyethoxy and benzyloxy groups), an aryloxy group having 6 to 18 carbon atoms (e.g., phenoxy, p-tolyloxy, 4-methoxyphenoxy and 4-t-butylphenoxy groups), an alkoxycarbonyl group having 2 to 19 carbon atoms (e.g., methoxycarbonyl, n-butoxycarbonyl and 2-ethylhexyloxycarbonyl groups) or an aryloxycarbonyl group having 6 to 25 carbon atoms. $R_6$ is preferably an alkoxycarbonyl group and more preferably a n-butoxycarbonyl group.

d is 0 or 1.

In formula [S-3], Ar is preferably an aryl group having 6 to 24 (preferably 6 to 18) carbon atoms (e.g., phenyl, 4-chlorophenyl, 2,4-dichlorophenyl, 4-methoxyphenyl, 1-naphthyl, 4-n-butoxyphenyl, 1,3,5-trimethylphenyl and 2-(2-n-butoxycarbonylphenyl)phenyl groups). Ar is more preferably a phenyl group, a 2,4-dichlorophenyl group or a 2-(2-n-butoxycarbonylphenyl)phenyl group.

e is an integer from 1 to 4 and preferably an integer from 1 to 3.

$R_7$ is a hydrocarbon group having a valence of e and 2 to 24 (preferably 2 to 18) carbon atoms (for example, those the same as the exemplary groups of the aliphatic group serving as $R_4$, a n-octyl group, those the same as the exemplary groups of the aryl group serving as $R_4$, and —$(CH_2)_2$—, and the following),

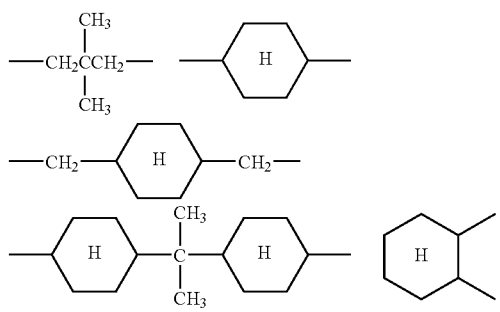

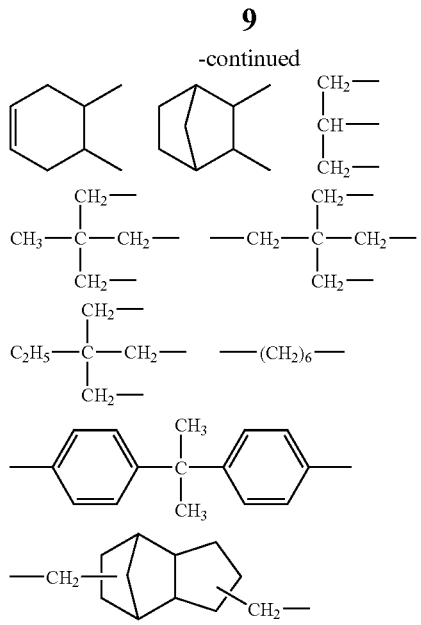

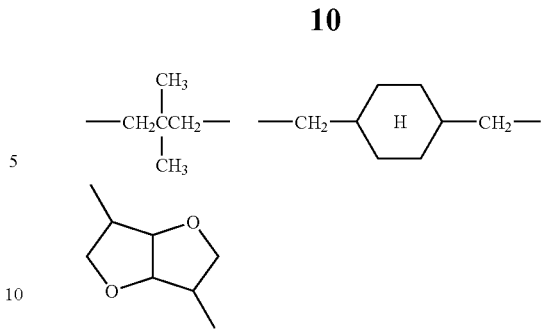

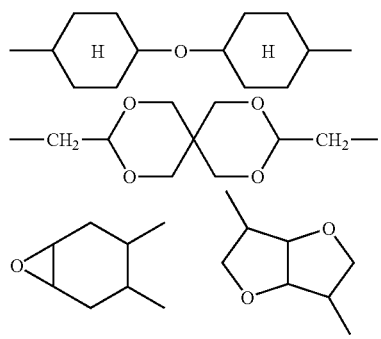

or a hydrocarbon group which has a valence of e and 4 to 24 (preferably 4 to 18) carbon atoms and in which hydrocarbon groups bond to each other via an ether bond (e.g., —CH$_2$CH$_2$OCH$_2$CH$_2$—, —CH$_2$CH$_2$(OCH$_2$CH$_2$)$_3$— and —CH$_2$CH$_2$CH$_2$OCH$_2$CH$_2$CH$_2$—, and the following).

In formula [S-5], g is an integer from 2 to 4 and preferably 2 or 3.

R$_{10}$ is preferably a hydrocarbon group having a valence of g (e.g., —CH$_2$—, —(CH$_2$)$_2$—, —(CH$_2$)$_4$—, —(CH$_2$)$_7$—, —(CH$_2$)$_8$—, or any of the following groups).

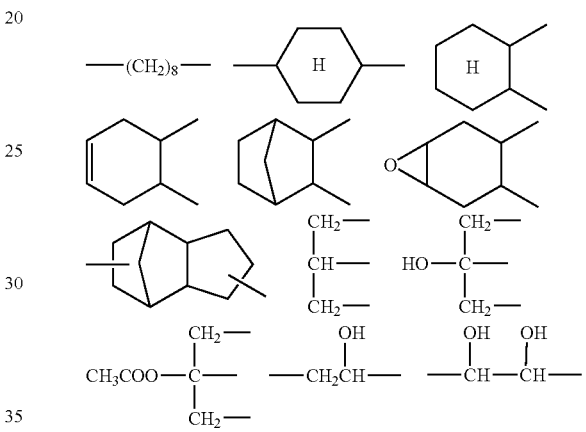

R$_{10}$ is more preferably —(CH$_2$)$_4$—, —(CH$_2$)$_8$—, or any of the following groups.

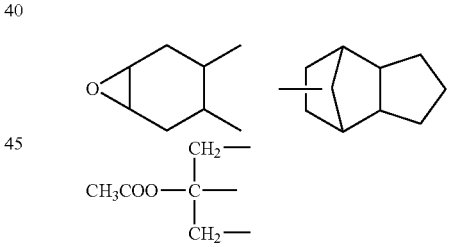

R$_7$ is more preferably an alkyl group and still more preferably a n-butyl group, a n-octyl group or a 2-ethylhexyl group.

In formula [S-4], R$_8$ is preferably an aliphatic group having 1 to 24 (preferably 1 to 17) carbon atoms (e.g., methyl, n-propyl, 1-hydroxyethyl, 1-ethylpenthyl, n-heptyl, n-undecyl, n-tridecyl, pentadecyl, 8,9-epoxyheptadecyl, cyclopropyl, cyclohexyl and 4-methylcyclohexyl groups). R$_8$ is more preferably a n-heptyl group, a n-tridecyl group, a 1-hydroxyethyl group, a 1-ethylpentyl group or a 8,9-epoxyheptadecyl group.

f is an integer from 1 to 4 and preferably an integer from 1 to 3.

R$_9$ is preferably a hydrocarbon group having a valence of f and 2 to 24 (preferably 2 to 18) carbon atoms or a hydrocarbon group which has a valence of f and 4 to 24 (preferably 4 to 18) carbon atoms and in which hydrocarbon groups bond to each other via an ether bond (for example, those the same as the examples for R$_7$, and 1-methyl-2-methoxyethyl and 2-hexyldecyl groups). R$_9$ is more preferably a 2-ethylhexyl group, a 2-hexyldecyl group, a 1-methyl-2-methoxyethyl group or any of the following groups.

R$_{11}$ is preferably an aliphatic group having 1 to 24 (preferably 4 to 18) carbon atoms or an aryl group having 6 to 24 (preferably 6 to 18) carbon atoms (for example, those the same as the examples of the aliphatic group and the aryl group serving as R$_4$), more preferably an alkyl group and still more preferably a n-butyl group, a n-octyl group or a 2-ethylhexyl group.

In formula [S-6], R$_{12}$ is preferably a hydrogen atom, an aliphatic group having 1 to 24 (preferably 3 to 20) carbon atoms (e.g., n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy) propyl, cyclohexyl, 4-methylcyclohexyl and 8-N,N-diethyl-carbamoyloctyl groups) or an aryl group having 6 to 24 (preferably 6 to 18) carbon atoms (for example, those the same as the examples of the aryl group serving Ar, and 3-methylphenyl and 2-(N,N-di-n-octylcarbamoyl)phenyl groups). R$_{12}$ is more preferably a n-undecyl group, an 8-N,N-diethylcarbamoyloctyl group, a 3-methylphenyl group or a 2-(N,N-di-n-octylcarbamoyl)phenyl group.

Each of $R_{13}$ and $R_{14}$ is preferably a hydrogen atom, an aliphatic group having 1 to 24 (preferably 1 to 18) carbon atoms (e.g., methyl, ethyl, isopropyl, n-butyl, n-hexyl, n-octyl, 2-ethylhexyl, n-dodecyl, n-tetradecyl, cyclopentyl and cyclopropyl groups) or an aryl group having 6 to 18 (preferably 6 to 15) carbon atoms (e.g., phenyl, 1-naphthyl and p-tolyl groups). Each of $R_{13}$ and $R_{14}$ is more preferably a methyl group, an ethyl group, a n-butyl group, a n-octyl group, a n-tetradecyl group or a phenyl group.

$R_{13}$ and $R_{14}$ may bond to each other so that they and a N atom form a pyrrolidine ring, a piperidine ring or a morpholine ring. Moreover, $R_{12}$ and $R_{13}$ may bond to each other so that they and a N atom form a pyrrolidone ring or a piperidine ring.

X is —CO— or —SO$_2$— and preferably —CO—.

In formula [S-7], $R_{15}$ is preferably an aliphatic group having 1 to 24 (preferably 3 to 18) carbon atoms (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl and cyclohexyl groups), an alkoxycarbonyl group having 2 to 24 (preferably 5 to 17) carbon atoms (e.g., n-butoxycarbonyl, 2-ethylhexyloxycarbonyl and n-dodecyloxycarbonyl groups), an aryloxycarbonyl group having 7 to 24 (preferably 7 to 18) carbon atoms (e.g., phenoxycarbonyl, naphthoxycarbonyl and cresyloxycarbonyl groups), an alkylsulfonyl group having 1 to 24 (preferably 1 to 18) carbon atoms (e.g., methylsulfonyl, n-butylsulfonyl and n-dodecylsulfonyl groups), an arylsulfonyl group having 6 to 30 (preferably 6 to 24) carbon atoms (e.g., p-tolylsulfonyl, p-dodecylphenylsulfonyl and p-hexadecyloxyphenylsulfonyl groups), an aryl group having 6 to 32 (preferably 6 to 24) carbon atoms (e.g., phenyl and p-tolyl groups) or a cyano group. $R_{15}$ is more preferably an aliphatic group having 1 to 24 carbon atoms or an alkoxycarbonyl group having 1 to 24 carbon atoms and still more preferably an aliphatic group having 1 to 24 carbon atoms.

$R_{16}$ is a halogen atom (preferably Cl), an aliphatic group having 1 to 24 (preferably 1 to 18) carbon atoms {more preferably an alkyl group (for example, those the same as the examples of the alkyl group serving as $R_{15}$) or a cycloalkyl group having 3 to 18 (preferably 5 to 17) carbon atoms (e.g., cyclopentyl and cyclohexyl groups)}, an aryl group having 6 to 32 (preferably 6 to 24) carbon atoms (e.g., phenyl and p-tolyl groups), an alkoxy group having 1 to 24 (preferably 1 to 18) carbon atoms (e.g., methoxy, n-butoxy, 2-ethylhexyloxy, benzyloxy, n-dodecyloxy and n-hexadecyloxy groups) or an aryloxy group having 6 to 32 (preferably 6 to 24) carbon atoms (e.g., phenoxy, p-t-butylphenoxy, p-t-octylphenoxy, m-pentadecylphenoxy and p-dodecyloxyphenoxy groups). $R_{16}$ is preferably an aliphatic group having 1 to 24 carbon atoms and more preferably an aliphatic group having 1 to 12 carbon atoms.

h is an integer of 1 or 2.

Typical examples of $R_{17}$ and $R_{18}$ in formula [S-8] are the same as the examples of $R_{13}$ and $R_{14}$ other than a hydrogen atom. Each of $R_{17}$ and $R_{18}$ is more preferably an aliphatic group and still more preferably a n-butyl group, a n-octyl group or a n-dodecyl group. However, $R_{17}$ and $R_{18}$ never bond to each other to form a ring.

Typical examples of $R_{19}$ are the same as those of $R_{16}$. $R_{19}$ is more preferably an alkyl group or an alkoxy group and still more preferably a n-octyl group, a methoxy group, a n-butoxy group or a n-octyloxy group.

i is an integer from 1 to 5.

In formula [S-9], typical examples of $R_{20}$ and $R_{21}$ are the same as those of $R_1$, $R_2$ and $R_3$ in the case where $R_{20}$ and $R_{21}$ do not bond to each other to form a ring. Each of $R_{20}$ and $R_{21}$ is more preferably a substituted or unsubstituted aliphatic group having 1 to 24 carbon atoms.

$R_{20}$ and $R_{21}$ may bond to each other to form a ring and the ring is preferably a three- to ten-membered ring and more preferably a five- to seven-membered ring.

j denotes 1 or 2 and is preferably 1.

Specific examples of the first high-boiling point organic solvent used in the invention, and the viscosities (values measured with the aforementioned device at 25° C. and 60° C.) and the boiling point of each of these high-boiling point organic solvents are shown below. Here, the boiling point of each of the high-boiling point organic solvents is a value under normal pressure into which the boiling point under a reduced pressure is converted. In the following specific examples, when a high-boiling point organic solvent has a boiling point of more than 170° C., the boiling point is omitted. Moreover, when a high-boiling point organic solvent is solid at 25° C., the viscosity thereof at 25° C. is omitted.

| | | Viscosity (mPa·s) | | Boiling point |
|---|---|---|---|---|
| | | (25° C.) | (60° C.) | (° C.) |
| Compound represented by Formula [S-1] | | | | |
| S-1 | O=P(—O—C$_6$H$_5$)$_3$ | — | 8.3 | 370 |
| S-2 | O=P(—O—C$_6$H$_4$—CH$_3$)$_3$ | 57.6 | 11.8 | 435 |
| S-3 | O=P(—O—C$_6$H$_4$—C$_3$H$_7$(i))$_3$ | 95 | 17.5 | 485 |

-continued

| | | Viscosity (mPa·s) | | Boiling point |
|---|---|---|---|---|
| | | (25° C.) | (60° C.) | (° C.) |
| S-4 | $O{=}P(O{-}C_6H_5)_2(O{-}C_6H_4{-}CH_3)$ | 36.2 | 8.2 | — |
| S-5 | $O{=}P(O{-}C_6H_4{-}C_9H_{19}(n))_2(OC_{10}H_{21})$ | 49 | 10.3 | 435 |
| S-6 | $O{=}P(OCH_2CHC_4H_9(n))_3$, with $C_2H_5$ branch | 11.7 | 4.0 | 390 |
| S-7 | $O{=}P(OCH_2C(CH_3)_2CH_2CHCH_3)_3$ | 20.22 | 5.8 | 420 |
| S-8 | $O{=}P(OC_{12}H_{25}(n))_3$ | 28.6 | 6.9 | 480 |
| S-9 | $O{=}P(OC_6H_{13}(n))_3$ | 6.62 | 3.0 | 365 |
| S-10 | $O{=}P(OCH_2CH_2Cl)_3$ | 20.8 | 5.5 | 360 |
| S-11 | $O{=}P(OCH_2CH_2OC_4H_9(n))_3$ | 10.9 | 3.8 | 400 |
| S-12 | $((EH)C_8H_{17})_3P{=}O$ | 41.1 | 9.0 | — |
| S-13 | $(n)C_8H_{17}{-}P({=}O)(OC_8H_{17}(n))_2$ | 13.7 | 4.3 | — |
| S-101 | $O{=}P(O{-}C_6H_3(CH_3)_2)_3$ | 189 | 29.1 | — |
| S-102 | $O{=}P(O{-}C_6H_4{-}C_3H_7(i))_n(O{-}C_6H_5)_{3-n}$ (n = 1.26/Rsofos65, manufactured by Ajinomoto K. K.) | 65 | 12.8 | 435 |
| S-103 | $O{=}P(O{-}C_6H_5)_2(OCH_2CHC_4H_9(n))$, with $C_2H_5$ branch | 17.5 | 5.0 | — |
| S-104 | $O{=}P(OC_4H_9(n))_3$ | 3.52 | 2.5 | — |
| S-105 | $((n)C_4H_9O)_2{-}P({=}O){-}O(CH_2)_8O{-}P({=}O){-}(OC_4H_9(n))_2$ | 63.2 | 12.6 | — |

-continued

| | | Viscosity (mPa·s) | | Boiling point |
|---|---|---|---|---|
| | | (25° C.) | (60° C.) | (° C.) |
| S-106 | O=P(–O–C₆H₅)₂–C₈H₁₇(n) | 83.4 | 15.6 | — |
| S-107 | O=P(–OC₄H₉(n))₂–C₄H₉(n) | 3.94 | 2.6 | — |
| S-108 | O=P(–O–C₆H₄–Cl)₃ | 74.4 | 14.3 | — |
| S-109 | O=P(–OC₁₀H₂₁(n))ₙ(–O–C₆H₄–C₉H₁₉(n))₃₋ₙ (mixture including components whose ns are 0 to 2 and mainly including a component whose n is 2) | 24.3 | 6.2 | — |

Compound represented by Formula [S-2]

| | | | | |
|---|---|---|---|---|
| S-14 | benzene-1,2-(COOC₄H₉(n))₂ | 20.3 | 5.1 | 370 |
| S-15 | benzene-1,2-(COOC₇H₁₅(branched))₂ | 34.9 | 8.0 | 380 |
| S-16 | benzene-1,2-(COOCH₂CH(C₂H₅)C₄H₉(n))₂ | 62.7 | 11.7 | 400 |
| S-17 | benzene-1,2-(COOC₁₂H₂₅(n))₂ | 52.1 | 10.8 | — |
| S-18 | benzene-1,2-(COOCH₂CH₂OC₄H₉(n))₂ | 42 | 9.1 | 335 |
| S-19 | benzene-1,2-(COOC₂H₅)(COOCH₂COOC₂H₅) | 74 | 14.2 | 355 |

| | Viscosity (mPa·s) | | Boiling point |
|---|---|---|---|
| | (25° C.) | (60° C.) | (° C.) |
| S-20 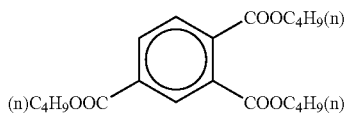 | 55.7 | 13.1 | 400 |
Compound represented by Formula [S-3]
| | Viscosity (mPa·s) | | Boiling point |
|---|---|---|---|
| S-21 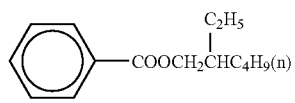 | 5.68 | 2.4 | 300 |
| S-22 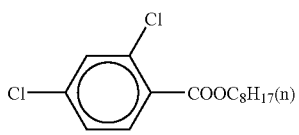 | 11.44 | 3.9 | 360 |
| S-23 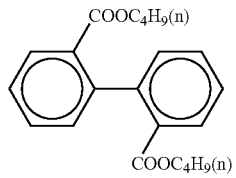 | 51.1 | 10.6 | — |
Compound represented by Formula [S-4]
| | Viscosity (mPa·s) | | Boiling point |
|---|---|---|---|
| S-24  | 7.17 | 3.1 | 380 |
| S-25 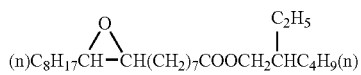 | 39.84 | 8.8 | — |
| S-26 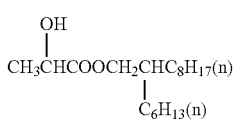 | 22.83 | 5.9 | — |
| S-27 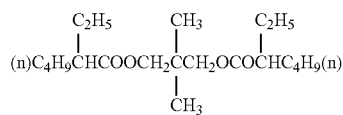 | 12 | 4.0 | — |
| S-28 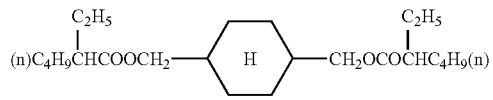 | 41.4 | 9.0 | 430 |
| S-29 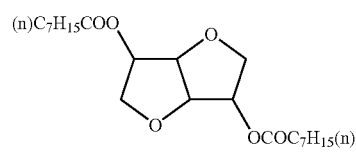 | 47.3 | 10.0 | 440 |
Compound represented by Formula [S-5]

-continued
|   | | Viscosity (mPa·s) | | Boiling point |
|---|---|---|---|---|
|   | | (25° C.) | (60° C.) | (° C.) |
| S-30 | $C_2H_5$ $\quad$ $C_2H_5$<br>(n)$C_4H_9$CHCH$_2$OCO(CH$_2$)$_4$COOCH$_2$CHC$_4$H$_9$(n) | 11.7 | 4.3 | 390 |
| S-31 | $C_2H_5$ $\quad$ $C_2H_5$<br>(n)$C_4H_9$CHCH$_2$OCO(CH$_2$)$_8$COOCH$_2$CHC$_4$H$_9$(n) | 19.9 | 6.1 | 410 |
| S-32 | (n)$C_4H_9$OCO(CH$_2$)$_8$COOC$_4$H$_9$(n) | 8.09 | 3.5 | 345 |
| S-33 | 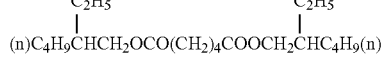 | 88.9 | 16.5 | — |
| S-34 |  | 37.50 | 8.4 | 440 |
| S-35 |  | 42.7 | 9.3 | 390 |
Compound represented by Formula [S-6]
| S-36 |  | 9.45 | 3.6 | 340 |
| S-37 |  | 45.8 | 9.8 | — |
| S-38 | 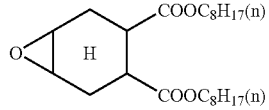 | 20.0 | 5.4 | 350 |
| S-39 | 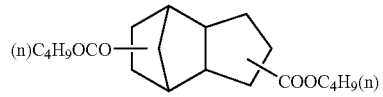 | 12.83 | 4.2 | 320 |
| S-40 | ((n)$C_8H_{17}$)$_2$NOC—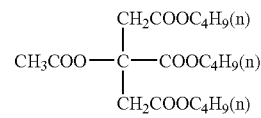—CON($C_8H_{17}$(n))$_2$ | 77.1 | 14.7 | — |
| S-41 | ($C_2H_5$)$_2$—NCO—(CH$_2$)$_8$—CON($C_2H_5$)$_2$ | 40.7 | 8.9 | 405 |
| S-42 | 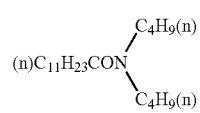 | 49.65 | 10.4 | — |
Compound represented -continued

| | | Viscosity (mPa·s) | | Boiling point |
|---|---|---|---|---|
| | | (25° C.) | (60° C.) | (° C.) |
| by Formula [S-7] | | | | |
| S-43 | 2,4-di-tert-butylphenol structure (HO-phenyl with two t-Bu groups) | 92 | 16.9 | — |
| Compound represented by Formula [S-8] | | | | |
| S-44 | N,N-di(n)$C_8H_{17}$-2-($OC_8H_{17}$(n))aniline | 15.5 | 4.6 | — |
| S-45 | N,N-di(n)$C_{12}H_{25}$-2,4-dimethoxyaniline ($OCH_3$, $OCH_3$) | 27.1 | 6.6 | — |
| S-46 | N,N-di(n)$C_8H_{17}$-2-methoxyaniline ($OCH_3$) | 35.3 | 8.0 | — |
| S-47 | N,N-di(n)$C_4H_9$-2-($OC_4H_9$(n))-5-$C_8H_{17}$(t)aniline | 79.14 | 15.0 | — |
| Compound represented by Formula [S-9] | | | | |
| S-48 | 3-$C_8H_{17}$(EH)-tetrahydrothiophene-1,1-dioxide | 37.62 | 8.4 | — |
| S-49 | phenyl-$CH_2SOCHCOOC_2H_5$ with $C_{12}H_{25}$(n) | 43.1 | 9.3 | — |
| Other compound | | | | |
| S-50 | $C_nH_{2n+1}$ (mixture of n-paraffins whose ns are 14 and 15) (e.g., "NP-SH" available from Mitsui Texaco Chemical) | 2.47 | 0.4 | 260 |

-continued

| | | Viscosity (mPa·s) | | Boiling point |
|---|---|---|---|---|
| | | (25° C.) | (60° C.) | (° C.) |
| S-51 | OC$_6$H$_{13}$(n), C$_5$H$_{11}$(t), C$_5$H$_{11}$(t) on benzene ring | 35.85 | 8.1 | 330 |
| S-52 | (C$_6$H$_5$)$_2$P(=O)–N(C$_8$H$_{17}$(n))$_2$ | 45.9 | 9.8 | — |
| S-53 | HO–C(CH$_2$COOC$_4$H$_9$(n))$_2$–COOC$_4$H$_9$(n) | 25.82 | 6.7 | — |

One of the above-described first high-boiling point organic solvents may be used alone or two or more of them (e.g., tricresyl phosphate and dibutyl phthalate, trioctyl phosphate and di(2-ethylhexyl) sebacate, and dibutyl phthalate and poly (N-t-butylacrylamide)) can be used in the form of a mixture thereof.

Examples, other than the above compounds, of the first high-boiling point organic solvent and methods for synthesizing these high-boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP Nos. 276,319A, 286,253A, 289,820A, 309,158A, 309,159A, 309,160A, 509,311A and 510,576A, East Germany Patent Nos. 147,009, 157,147, 159,573 and 225,240A, GB Patent No. 2,091,124A and JP-ANos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338.

—Second High-Boiling Point Organic Solvent—

The second high-boiling point organic solvent contained in the second ink set is characterized in that it is represented by the aforementioned formula (I).

Explanations of each of the groups in formula (I) and the typical examples are the same as in formula [S-1] of the first high-boiling point organic solvent, except that l, m and n correspond a, b and c, respectively.

Specific examples of the second high-boiling point organic solvent represented by formula (I) include the following compounds as well as the examples of the compound of formula [S-1]. The measuring and conversion methods of the viscosity and the boiling point of each of the following high-boiling point organic solvents are the same as those of the specific examples of the first high-boiling point organic solvent.

| | | Viscosity (mPa·s) | | Boiling Point |
|---|---|---|---|---|
| | | (25° C.) | (60° C.) | (° C.) |
| 1-1 | O=P(–O–C$_6$H$_{11}$)$_3$ | — | 33.4 (65° C.) | — |
| 1-2 | dibenzofuran-type O–P(=O)–C$_8$H$_{17}$(EH) | 484.7 | 43.1 | — |

-continued

| | | Viscosity (mPa·s) | | Boiling Point |
|---|---|---|---|---|
| | | (25° C.) | (60° C.) | (° C.) |
| 1-3 | 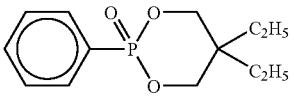 | 382.5 | 42.2 | — |
| 1-4 | 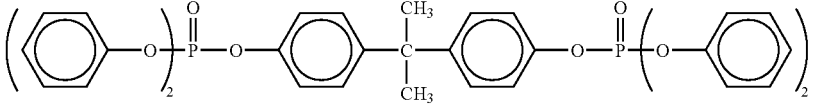 | 407 | 42.8 | — |

The compound (I-1) is solid at 60° C. and, therefore, the viscosity shown is a value measured at 65° C.

The second high-boiling point organic solvent is a compound that is not polymerized even in the presence of a polymerization initiator. To attain this, it is necessary that the solvent has no olefin group.

The viscosity of the second high-boiling point organic solvent at 25° C. is preferably 100 mPa·s or less, more preferably 70 mPa·s or less and still more preferably 20 mPa·s or less. Also, the viscosity of the solvent at 60° C. is preferably 30 mPa·s or less, more preferably 20 mPa·s or less and still more preferably 10 mPa·s or less.

When the viscosity is higher than the above range, it is difficult to eject such an ink from an ordinary ink jet nozzle, which may cause, for example, jetting inferior and then form an image having a missing portion. That is, good image formation may be hindered.

The boiling point of the second high-boiling point organic solvent is preferably 100° C. or higher, more preferably 170° C. or higher, still more preferably 200° C. or higher and most preferably 250° C. or higher under normal pressure. When the boiling point is less than the above range, the organic solvent may diffuse into the air during operation, which requires a special device to prevent such diffusion.

The second high-boiling point organic solvent is not limited to those which are liquid at room temperature. That is, the solvent may be what is crystal having a low melting point, what is amorphous solid, or what is paste. When the solvent is crystal at room temperature, the melting point of the solvent is preferably 100° C. or lower and more preferably 80° C. or lower.

The solubility of water in the second high-boiling point organic solvent at 25° C. is preferably 4 g or less, more preferably 3 g or less, still more preferably 2 g or less and most preferably 1 g or less.

One of these second high-boiling point organic solvents may be used alone or two or more of them can be used in the form of a mixture thereof. The second high-boiling point organic solvent(s) may be used in combination with other organic solvents. Examples of other organic solvents include aromatic carboxylates such as phthalates and benzoates, aliphatic carboxylates such as succinates and adipates, amide compounds, epoxy compounds, aniline compounds and phenol compounds. Other organic solvent is preferably phthalate, benzoate, aliphatic carboxylate, an amide compound or an epoxy compound, and more preferably phthalate, benzoate or an aliphatic carboxylate.

When other organic solvent(s) is used together with phosphate(s) serving as the second high-boiling organic solvent(s), the content of the second high-boiling point organic solvent(s) (i.e., high-boiling point organic solvent(s) represented by formula (I)) in all the solvents is preferably 25% by mass or more, and more preferably 50% by mass or more. When other organic solvent(s) is used together with at least one of phosphonates, phosphinates and phosphine oxides serving as the second high-boiling organic solvent, the content of the second high-boiling point organic solvent(s) in all the solvents is preferably 10% by mass or more, and more preferably 25% by mass or more.

When the second high-boiling point organic solvent is crystal having a melting point exceeding 80° C., the solvent is preferably used together with other second high-boiling point organic solvent(s).

—Third High-Boiling Point Organic Solvent—

The third high-boiling point organic solvent contained in the third ink set is characterized in that it is represented by the aforementioned formula (II).

When Each of $R_5$ and $R_6$ has at least one substituent in formula (II), the substituent may have one or more connecting groups each selected from —COO—, —CON=, —$R_{10}$—N= and —O—. $R_{10}$ represents a di- to hexa-valent group obtained by eliminating hydrogen atoms from a phenyl group.

In formula (II), the alkyl group represented by each of $R_5$ and $R_6$ may be either linear or branched, and preferably has 1 to 25 carbon atoms in total, more preferably 1 to 20 carbon atoms in total and still more preferably 4 to 18 carbon atoms in total.

Examples of the unsubstituted alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group. The unsubstituted alkyl group serving as $R_5$ is preferably a heptyl group, a nonyl group, an undecyl group, a tridecyl group, a pentadecyl group or a heptadecyl group, and more preferably an undecyl group, a tridecyl group, a pentadecyl group or a heptadecyl group. The unsubstituted alkyl group serving as $R_6$ is preferably an octyl group, a decyl group, a dodecyl group, a tetradecyl group, a hexadecyl group or an octadecy group, and more preferably a dodecyl group, a tetradecyl group, a hexadecyl group or an octadecy group.

Examples of the substituent(s) which the substituted alkyl groups may have include halogen atoms, cycloalkyl groups, aryl groups and ester groups. Specific examples of the substituted alkyl group having such a substituent or substituents include substituted alkyl groups having at least one halogen atom (e.g., F, Cl or Br), substituted alkyl groups having at least one cycloalkyl group, substituted alkyl groups having at least one aryl group, substituted alkyl groups due to each of which the compound of formula (II) is dibasic acid ester, substituted alkyl groups due to each of which the compound of formula (II) is lactic acid ester, substituted alkyl groups due to each of which the compound of formula (II) is citric acid ester, substituted alkyl groups due to each of which the compound of formula (II) is malic acid ester and substituted alkyl groups due to each of which the compound of formula (II) is tartaric acid ester. Specific examples of the substituted alkyl group are shown below.

Substituted alkyl group having at least one halogen atom
—$C_2HF_4$ —$C_5H_3F_8$ —$C_9H_3F_{16}$
—$C_2H_4Cl$ —$C_3H_4Cl_3$
—$C_3H_5ClBr$ —$C_3H_5Br_2$ Substituted alkyl group having at least one cycloalkyl group

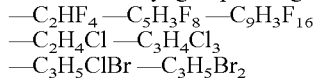

Substituted alkyl group having at least one aryl group

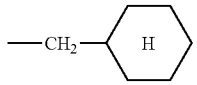

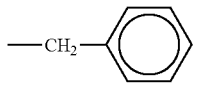 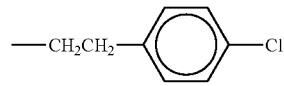

Substituted alkyl group due to which compound of Formula (II) is dibasic acid ester

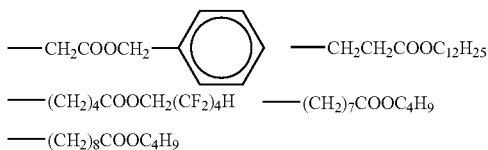

Substituted alkyl group due to which compound of Formula (II) is lactic acid ester

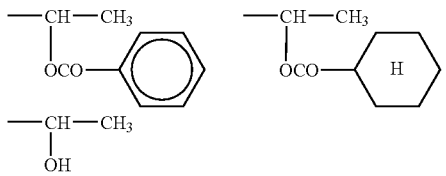

Substituted alkyl group due to which compound of Formula (II) is citric acid ester

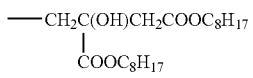

Substituted alkyl group due to which compound of Formula (II) is malic acid ester

—$CH_2CH(OH)COOC_6H_{13}$

Substituted alkyl group due to which compound of Formula (II) is tartaric acid ester

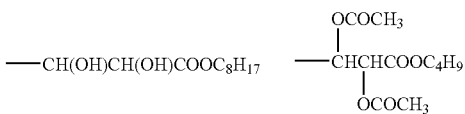

Other substituted alkyl group

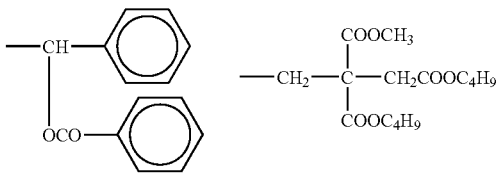

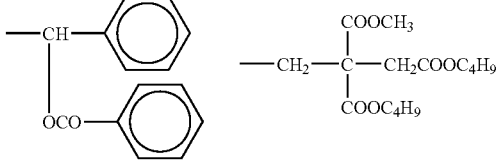

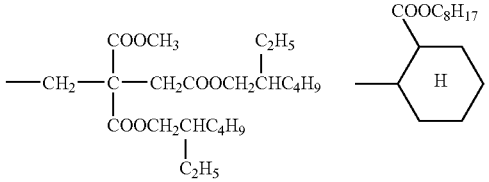

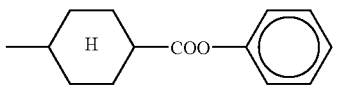

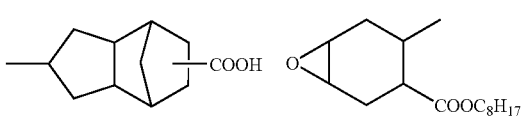

When at least one of $R_5$ and $R_6$ is a substituted or unsubstituted alkyl group, it is preferably an unsubstituted alkyl group, a substituted alkyl group due to which the compound of formula (II) is dibasic acid ester, an alkyl group having at least one halogen atom, an alkyl group having at least one cycloalkyl group or a substituted alkyl group due to which the compound of formula (II) is citric acid ester, and more preferably an unsubstituted alkyl group, a substituted alkyl group due to which the compound of formula (II) is dibasic acid ester or an alkyl group having at least one halogen atom.

The cycloalkyl group represented by each of $R_5$ and $R_6$ in formula (II) preferably has 3 to 10 carbon atoms in total, more preferably 4 to 8 carbon atoms in total, and still more preferably 5 to 7 carbon atoms in total.

Examples of the unsubstituted cycloalkyl group include a cyclopentyl group, and a cyclohexyl group. The unsubstituted cycloalkyl group is preferably a cyclohexyl group.

The substituted cycloalkyl group is preferably a cycloalkyl group having at least one —COOR group (R represents a linear, branched or cyclic hydrocarbon group which may have at least one unsaturated bond) or a cycloalkyl group having at least one halogen atom and more preferably a cycloalkyl group having at least one —COOR group.

Specific examples of the substituted cycloalkyl group include the following groups.

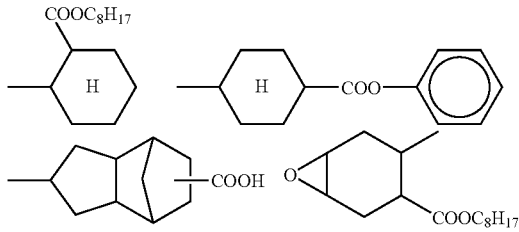

The aryl group represented by each of $R_5$ and $R_6$ in formula (II) preferably has 6 to 24 carbon atoms in total, more preferably 6 to 18 carbon atoms in total, and still more preferably 6 to 12 carbon atoms in total.

Examples of the unsubstituted aryl group include a phenyl group and a naphthyl group. The unsubstituted aryl group is preferably a phenyl group.

Examples of the substituted aryl group include substituted aryl groups due to each of which the compound of formula (II) is phthalic acid ester, substituted aryl groups due to each of which the compound of formula (II) is isophthalic acid ester, substituted aryl groups due to each of which the compound of formula (II) is terephthalic acid ester, substituted aryl groups due to each of which the compound of formula (II) is trimellitic acid ester and substituted aryl groups due to each of which the compound of formula (II) is substituted benzoic acid ester. Specific examples of the substituted aryl group are shown below.

Substituted aryl group due to which compound of Formula (II) is phthalic acid ester

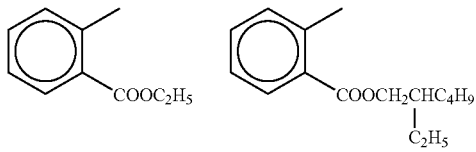

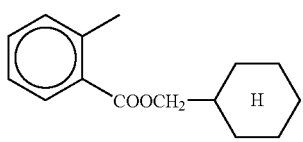

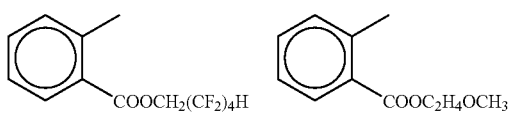

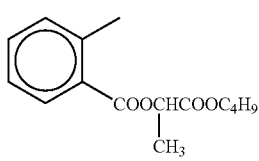

Substituted aryl group due to which compound of Formula (II) is isophthalic acid ester

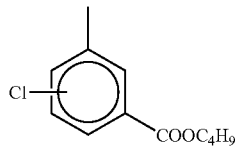

Substituted aryl group due to which compound of Formula (II) is terephthalic acid ester

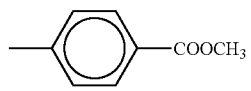

Substituted aryl group due to which compound of Formula (II) is trimellitic acid ester

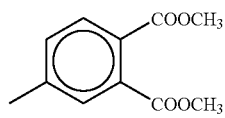

Substituted aryl group due to which compound of Formula (II) is substituted benzoic acid ester

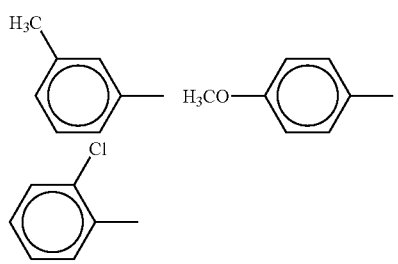

The substituted aryl group is preferably a substituted aryl group due to which the compound of formula (II) is phthalic acid ester, a substituted aryl group due to which the compound of formula (II) is isophthalic acid ester, a substituted aryl group due to which the compound of formula (II) is terephthalic acid ester or a substituted aryl group due to which the compound of formula (II) is trimellitic acid ester, and more preferably a substituted aryl group due to which the compound of formula (II) is phthalic acid ester or a substituted aryl group due to which the compound of formula (II) is trimellitic acid ester.

The heterocyclic group represented by each of $R_5$ and $R_6$ in formula (II) is preferably a five- to fourteen-membered heterocyclic group and more preferably a five- to ten-membered heterocyclic group. Each of the heteroatom(s) contained in the group can be a nitrogen atom, an oxygen atom or a sulfur atom. The heteroatom is preferably a nitrogen atom or an oxygen atom.

Examples of the unsubstituted heterocyclic group include furanyl, thienyl, oxazolyl, thiazolyl, imidazolyl, triazolyl, pyrrolidinyl, benzoxazolyl, benzothiazolyl, pyridyl, pyridazyl, pyrimidinyl, pyrazinyl, triazinyl, quinolinyl, isoquinolinyl, phthalazinyl, quinoxalinyl, quinazolinyl, purinyl, pteridinyl, azepinyl and benzoxepunyl groups. The unsubstituted heterocyclic group is preferably a furanyl group, a pyrrolidinyl group, a pyrimidinyl group, a pyridyl group, an imidazolyl group, or a triazolyl group, and more preferably a furanyl group, a pyrrolidinyl group, or a pyrimidinyl group.

Examples of the substituent(s) of the substituted heterocyclic group include alkyl groups, aryl groups, heterocyclic groups, alkyloxy groups, aryloxy groups, heterocyclic oxy groups and halogen atoms. The substituent is preferably an alkyl group, an aryl group or a halogen atom, and more preferably an alkyl group or a halogen atom.

When at least one of $R_5$ and $R_6$ in formula (II) has at least one alkenyl group as the substituent(s), the compound of formula (II) undesirably has a polymerizing action (polymerizability). Therefore, the group which at least one of $R_5$ and $R_6$ may have as the substituent is preferably an alkyl group, a cycloalkyl group, an aryl group or a heterocyclic group.

The third high-boiling point organic solvent represented by formula (II) is preferably a compound represented by the following formula (II-1).

$$R_7\text{—OCO—}R_8\text{—COO—}R_9 \qquad \text{Formula (II-1)}$$

In formula, $R_7$ and $R_9$ independently represent a substituted or unsubstituted alkyl group or a substituted or unsubstituted cycloalkyl group. $R_8$ represents a divalent connecting group which is an aliphatic group or an alicyclic group.

In formula (II-1), the groups represented by $R_7$ and $R_9$ are the same as the substituted and unsubstituted alkyl groups and the substituted and unsubstituted cycloalkyl groups serving as $R_5$ and $R_6$ and the typical examples thereof are also the same as those of the substituted and unsubstituted alkyl groups and the substituted and unsubstituted cycloalkyl groups serving as $R_5$ and $R_6$.

The divalent connecting group which is an aliphatic group or an alicyclic group is a group obtained by removing one hydrogen atom from the alkyl group, the cycloalkyl group, the aryl group or the heterocyclic group represented by each of $R_5$ and $R_6$ and typical examples thereof are those obtained by removing one hydrogen atom from the specific examples of the group represented by each of $R_5$ and $R_6$.

Specific examples of the third high-boiling point organic solvent represented by formula (II) (including those represented by formula (II-1)) and the viscosities and the boiling points thereof are shown below. The methods of measuring and converting the viscosity and the boiling point are the same as those of the aforementioned specific examples of the first high-boiling point organic solvent. The invention is not limited by these examples.

|   |   | Viscosity (m·Pas) | | Boiling point |
|---|---|---|---|---|
|   |   | (25° C.) | (60° C.) | (° C.) |
| 2-1 | ![benzene with two ortho COOC₁₀H₂₁(n)] | 43.2 | 9.3 | — |
| 2-2 | ![benzene with two ortho COOC₂H₅] | 10.1 | 3.7 | 296 |
| 2-3 | ![benzene with two ortho COOC₈H₁₇(n)] | 40.0 | 8.8 | 430 |
| 2-4 | ![benzene with two ortho COOC₁₈H₃₇(iso)] | 117 | 20.4 | 450 |
| 2-5 | ![benzene with COOC₁₀H₂₁(n)] | 7.97 | 3.3 | 350 |
| 2-6 | ![benzene with COOC₁₀H₂₁(iso)] | 8.7 | 3.4 | 340 |
| 2-7 | ![benzene with COOC₁₂H₂₅(n)] | 10.7 | 3.8 | 380 |
| 2-8 | ![benzene with COOCH₂CH₂OC₄H₉(n)] | 6.08 | 2.9 | 320 |

|  | Viscosity (m·Pas) | | Boiling point |
|---|---|---|---|
|  | (25° C.) | (60° C.) | (° C.) |
| 2-9 | 5.56 | 2.9 | 280 |
| 2-10 | 5.08 | 2.8 | 305 |
| 2-11 | 16.48 | 4.8 | — |
| 2-12 | 11.4 | 3.9 | 420 |
| 2-13 | 6.78 | 3.1 | 330 |
| 2-14 | 2.3 | 1.0 | 213 |
| 2-15 | 2.4 | 1.0 | — |
| 2-16 | 9.0 | 3.5 | 323 |
| 2-17 | 4.54 | 2.7 | 300 |
| 2-18 | 7.60 | 3.2 | 380 |
| 2-19 | 44.2 | 9.5 | — |
| 2-20 | 8.9 | 3.5 | 315 |
| 2-21 | 39.84 | 8.8 | — |
| 2-22 | 19.9 | 6.1 | 410 |

Structures shown for each compound:

- 2-9: (CH$_2$)$_4$ with two COOC$_4$H$_9$(iso) groups
- 2-10: (CH$_2$)$_4$ with two COOC$_4$H$_9$(n) groups
- 2-11: (CH$_2$)$_4$ with two COOC$_9$H$_{19}$(iso) groups
- 2-12: (CH$_2$)$_7$ with two COOC$_8$H$_{17}$(EH) groups
- 2-13: (n)C$_8$H$_{17}$O—C(=O)—OC$_8$H$_{17}$(n)
- 2-14: C$_6$H$_5$—CH$_2$OCOCH$_3$
- 2-15: C$_6$H$_5$—CH$_2$OCOC$_2$H$_5$
- 2-16: C$_6$H$_5$—CH$_2$OCO—C$_6$H$_5$
- 2-17: C$_6$H$_5$—CH$_2$OCOC$_7$H$_{15}$(n)
- 2-18: C$_6$H$_5$—CH$_2$OCOC$_{11}$H$_{23}$(n)
- 2-19: C$_2$H$_5$C(CH$_2$OCOC$_9$H$_{19}$(n))$_3$
- 2-20: CH$_2$COO—C$_4$H$_9$(n) / CHCOO—C$_4$H$_9$(n) / CH$_2$COO—C$_4$H$_9$(n)
- 2-21: (n)C$_8$H$_{17}$—CH—CH—(CH$_2$)$_7$COOC$_3$H$_7$(n) with epoxide O
- 2-22: (CH$_2$)$_8$ with two COOC$_8$H$_{17}$(EH) groups -continued

| | | Viscosity (m·Pas) | | Boiling point |
|---|---|---|---|---|
| | | (25° C.) | (60° C.) | (° C.) |
| 2-23 | cyclohexane-1,2-dicarboxylic acid bis(2-ethylhexyl) ester (H on ring); COOC$_8$H$_{17}$(EH), COOC$_8$H$_{17}$(EH) | 32.5 | 7.6 | 400 |
| 2-24 | HO—C(CH$_2$COOC$_8$H$_{17}$(EH))(COOC$_8$H$_{17}$(EH))(CH$_2$COOC$_8$H$_{17}$(EH)) | 76.6 | 14.6 | 470 |
| 2-25 | 2-chlorobenzene with COOC$_{12}$H$_{25}$(n) | 13.7 | 4.3 | 380 |
| 2-26 | (n)C$_4$H$_9$CHOCOCH$_2$—[tricyclic]—CH$_2$COOCHC$_4$H$_9$(n), with C$_2$H$_5$ branches | 303.30 | 38.7 | 520 |
| 2-27 | epoxycyclohexane with COOC$_{10}$H$_{21}$(iso), COOC$_{10}$H$_{21}$(iso) | 139.44 | 23.4 | — |
| 2-28 | COOC$_{18}$H$_{37}$(iso)—CHOH—CHOH—COOC$_{18}$H$_{37}$(iso) | 123 | 21.2 | — |
| 2-29 | H$_3$C—CH(OCO-phenyl)—COOC$_8$H$_{17}$(EH) | 21.3 | 5.6 | 350 |
| 2-30 | H$_3$C—CH(OCO-phenyl)—COOC$_{18}$H$_{37}$(iso) | 323 | 40.0 | 460 |
| 2-31 | CH$_3$COO—C(CH$_2$COOC$_8$H$_{17}$(EH))(COOC$_8$H$_{17}$(EH))(CH$_2$COOC$_8$H$_{17}$(EH)) | 89.9 | 16.6 | 440 |
| 2-32 | CH$_3$O—(phenyl)—COOC$_8$H$_{17}$(n) | 15.3 | 4.6 | 360 |

Other examples of the third high-boiling point organic solvent represented by formula (II) include the aforementioned compounds S-14, S-16, S-17, S-20, S-25, S-27, S-28, S-32, S-34 and S-53, which are the specific examples of the first high-boiling point organic solvent.

The third high-boiling point organic solvent is a compound that is not polymerized even in the presence of a polymerization initiator. To attain this, it is necessary that the solvent has no olefin group.

The preferable ranges of the viscosity and the boiling point of the third high-boiling point organic solvent are the same as those of the second high-boiling point organic solvent. Moreover, the preferable ranges of the melting point thereof and the solubility of water therein are the same as those of the first high-boiling point organic solvent.

One of these third high-boiling point organic solvents may be used alone or two or more of them can be used in the form of a mixture thereof. The third high-boiling point organic solvent(s) may be used in combination with other organic solvent(s). Examples of other organic solvent include phosphate, phosphonate, phosphinate, phosphine oxide, an amide compound, an epoxy compound, an aniline compound and a phenol compound. Other organic solvent is preferably phosphate, an amide compound or an epoxy compound, and more preferably phosphate.

When other organic solvent(s) is used together with the third high-boiling organic solvent(s), the content of the third high-boiling point organic solvent(s) in all the solvents is preferably 25% by mass or more and more preferably 50% by mass or more. When the third high-boiling point organic solvent is crystal having a melting point exceeding 80° C., the solvent is preferably used together with other high-boiling point organic solvent(s).

When at least one colorant is contained in the ink set of the invention, the content of the first, second or third high-boiling point organic solvent(s) is preferably 5 to 2000 parts by mass and more preferably 10 to 1000 parts by mass relative to 100 parts by mass of the colorant(s).

The content of the first, second, or third high-boiling point organic solvent(s) in the first liquid is preferably 5 to 100% by mass, more preferably 20 to 95% by mass and still more preferably 50 to 95% by mass. When the content is within the above range, the effect of the invention can be sufficiently obtained. The content of the solvent(s) in the second liquid is preferably 0 to 30% by mass, more preferably 0 to 5% by mass and still more preferably 0% by mass.

<Polymerizable Compound>

It is essential requirements in the invention that the polymerizable compound is contained in the second liquid and that the high-boiling point organic solvent is contained in the first liquid. The polymerizable compound has the ability to be polymerized in the presence of initiating species such as radicals generated by the polymerization initiator explained later and to cure.

It is preferable that the polymerizable compound and the polymerization initiator are contained in different liquids. When the ink jet recording ink set of the invention is, for example, a two-liquid type ink set composed of the first and second liquids, it is preferable that the first liquid contains the polymerization initiator but does not substantially contain the polymerizable compound. Moreover, when the ink jet recording ink set of the invention is composed of three or more liquids, the polymerizable compound may be contained in at least one of liquids of the ink set of the invention which are other than the first and second liquids.

The phrase "does not substantially contain the polymerizable compound" means that the content of the polymerizable compound in the liquid is such that it does not contribute to the polymerization. Specifically, the content is generally 20% by mass or less, preferably 10% by mass and more preferably 5% by mass.

The polymerizable compound is preferably an addition-polymerizable compound having at least one ethylenically unsaturated double bond and is preferably selected from polyfunctional compounds having at least one terminal ethylenically unsaturated bond, preferably two or more terminal ethylenically unsaturated bonds. Such a compound is well known in the industrial fields concerned, and the polymerizable compound may be selected from known compounds in the fields. Examples of the compound include monomers and prepolymers (e.g., dimers, trimers and oligomers) meeting the above condition, and mixtures of at least two of these compounds and copolymers obtained from at least two of these compounds.

The polymerizable compound preferably contains at least one polymerizable group such as an acryloyl group, a methacryloyl group, an allyl group, a vinyl group or a group internally containing at least one double bond (e.g., maleic acid). The polymerizable compound more preferably at least one of acryloyl and methacryloyl groups, because it can be cured at a low energy.

Examples of the polyfunctional polymerizable compound include vinyl group-containing aromatic compounds; (meth)arylates which are esters made of polyhydric alcohols and (meth)acrylic acids, (meth)arylamides which are amides made of multivalent amines and (meth)acrylic acids, polyester(meth)acrylates each obtained by introducing at least one (meth)acrylic acid molecule into an ester obtained by bonding at least one polybasic acid to at least one divalent alcohol or into polycaprolactone, polyether(meth)acrylates each obtained by introducing at least one (meth)acrylic acid molecule into an ether obtained by bonding at least one alkylene oxide to at least one polyhydric alcohol, epoxy(meth)acrylates obtained by introducing at least one (meth)acrylic acid molecule into an epoxy resin or obtained by reacting polyhydric alcohols with epoxy-containing monomers, urethaneacrylates having at least one urethane bond, amino resin acrylates, acrylic resin acrylates, alkyd resin acrylates, spiran resin acrylates, silicone resin acrylates, products obtained by reacting unsaturated polyesters with the aforementioned photopolymerizable monomers, and products obtained by reacting waxes with the polymerizable monomers. The polyfunctionao polymerizable compound is preferably (meth)acrylate, polyester (meth)acrylate, polyether (meth)acrylate, epoxyacrylate, urethaneacrylate, acrylic resin acrylate, silicone resin acrylate or a product obtained by reacting at least one unsaturated polyester with at least one of the photopolymerizable monomers and more preferably acrylate, polyester acrylate, polyether acrylate, epoxyacrylate or urethaneacrylate.

The term "(meth)acrylic acid" in the specification means acrylic acid, or methacrylic acid, or both in some cases.

Specific examples of the polyfunctional polymerizable compound include divinylbenzene, 1,3-butanediol diacrylate, 1,6-hexanediol diacrylate, pentaerythritol triacrylate, trimethylolpropane triacrylate, dipentaerythritol hexaacrylate, 1,6-acryloylaminohexane, hydroxypivalate, neopentyl glycol diacrylate, polyester acrylate which has at least one (meth)acryloyl group at one or more terminal of a polyester molecule having a molecular weight of 500 to 30,000 and obtained by reacting at least one dibasic acid with at least one dihydric alcohol, polyethylene glycol diacrylate, epoxyacrylates having a bisphenol (A, S, or F) skeleton and a molecular weight of 450 to 30,000, epoxyacrylates having a phenol novolac resin skeleton and a molecular weight of 600 to 30,000, products having a molecular weight of 350 to 30000 and obtained by reacting polyvalent isocyanates with (meth) acrylic acid monomers having at least one hydroxyl group, and modified products each having at least one urethane bond in the molecule thereof.

Examples of the monofunctional polymerizable monomer usable in the invention include (meth)acrylate, styrene, acrylamide, a vinyl group-containing monomer (e.g., vinyl esters, vinyl ethers and N-vinylamides) and (meth)acrylic acids. The monofunctional polymerizable monomer is preferably (meth)acrylate, acrylamide, vinyl ester or vinyl ether, and more preferably (meth)acrylate or acrylamide. The polymerizable monomer may have at least one substituent. Examples of the substituent include a halogen atom, a hydroxyl group, an amide group and a carboxylic group.

Specific examples of the monofunctional polymerizable monomer include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethylacrylamide, N,N-diethylaminopropylacrylamide, N-butoxymethylacrylamide, acryloylmorpholine, 2-hydroxyethyl vinyl ether, N-vinylformamide, N-vinylacetamide, 2-cyclohexylcarbamoyloxyethyl acrylate, acrylate having at least one polybutylacrylate moiety in ester, and acrylate having at least one polydimethylsiloxane moiety in ester.

One of these polymerizable compounds may be used alone or two or more of them can be used together.

The content of the polymerizable compound(s) in all the solid matters contained in the second liquid is preferably 20 to 98% by mass, more preferably 40 to 95% by mass and still more preferably 50 to 90% by mass. The content of the polymerizable compound(s) in all the solid matters contained in the first liquid is preferably 0 to 30% by mass, more preferably 0 to 5% by mass and still more preferably 0% by mass.

<Polymerization Initiator>

At least one of the plural liquids (including the first liquid and the second liquid) of the ink jet recording ink set of the invention preferably contains at least one polymerization initiator in order to cure the polymerizable compound(s). The polymerization initiator is preferably contained in at least one of liquids containing no polymerizable compound from the viewpoint of storage stability of the plural liquids. Application of energy to both of the polymerizable compound(s) and the polymerization initiator(s) on a recording medium causes polymerization and curing reaction.

The polymerization initiator(s) used in the invention is a compound (radical generating agent) that generates initiating species such as radicals due to energy of light, heat or both so as to initiate and promote the polymerization of the polymerizable compound(s). The polymerization initiator(s) in the invention may be appropriately selected from known thermal polymerization initiators, compounds containing at least one bond having low bond dissociation energy, and photo-polymerization initiators.

Examples of such a radical generating agent include organic halide compounds, carbonyl compounds, organic peroxide compounds, azo polymerization initiators, azide compounds, metallocene compounds, hexaarylbiimidazole compounds, organic boric acid compounds, disulfonic acid compounds, and onium salt compounds.

The polymerization initiator in the invention is preferably a photo-polymerization initiator. Examples of the photo-polymerization initiator include acetophenone derivatives, benzophenone derivatives, benzil derivatives, benzoin derivatives, benzoin ether derivatives, benzil dialkyl ketal derivatives, thioxanthone derivatives, acylphosphine oxide derivatives, metal complexes, p-dialkylaminobenzoic acid, azo compounds and peroxide compounds. The photo-polymerization initiator is preferably an acetophenone derivative, a benzil derivative, a benzoin ether derivative, a benzil dialkyl ketal derivative, a thioxanthone derivative or an acylphosphine oxide derivative, and more preferably an acetophenone derivative, a benzoin ether derivative, a benzil dialkyl ketal derivative or an acylphosphine oxide derivative.

Specific examples of such a photo-polymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketone, benzil, benzoin, benzoin methyl ether, benzoin isopropyl ether, benzoin-n-propyl ether, benzoin isobutyl ether, benzil dimethyl ketal, 1-hydroxy-cyclohexyl phenyl ketone, tetramethylthiuram monosulfide, thioxanthone, 2-chlorothioxanthone, 2,4-dimethylthioxanthone, 2,2-dimethylpropyloyl diphenylphosphine oxide, 2-methyl-2-ethylhexanoyldiphenylphosphine oxide, 2,6-dimethylbenzoyl diphenylphosphine oxide, 2,6-dimethoxybenzoyl diphenylphosphine oxide, 2,4,6-trimethylbenzoyl diphenylphosphine oxide, bis(2,6-dimethoxybenzoyl)-2,4,4-trimethylpentylphosphine oxide, 2,3,6-trimethylbenzoyl-diphenylphosphine oxide, bis(2,3,6-trimethylbenzoyl)-pentylphosphine oxide, 2,4,6-trimethoxybenzoyl-diphenylphosphine oxide, 2,4,6-trichlorobenzoyldiphenylphosphine oxide, 2,4,6-trimethylbenzoylnaphthyl phosphonate, bis(η5-2,4-cyclopentadiene-1-yl)-bis(2,6-difluoro-3-(1H-pyrrole-1-yl)-phinyl) titanium, p-dimethylaminobenzoic acid, p-diethylaminobenzoic acid, azobisisobutyronitrile, 1,1'-azobis(1-acetoxy-1-phenylethane), benzoin peroxide and di-tert-butyl peroxide.

Also, at least one of the photo-polymerization initiators described in ULTRAVIOLET RAY CURABLE SYSTEM written by Kato Seishi and published by k.k. Sogo Gizyutsu Center in 1989, pp 65-148 can be used as the photo-polymerization initiator in the invention.

Although the polymerization initiator preferably has a high sensitivity, it is undesirable to use a polymerization initiator that thermally decomposes at a temperature of 80° C. or lower from the viewpoint of storage stability. Therefore, it is preferable to select a polymerization initiator that does not thermally decompose at a temperature of 80° C. or lower.

One of these polymerization initiators may be used alone, or two or more of them can be used together. Also, the polymerization initiator(s) may be used in combination with at least one known sensitizer for the purpose of improving sensitivity, insofar as the effect of the invention is not impaired.

The polymerization initiator(s) is preferably contained in a liquid different from a liquid containing the polymerizable compound(s). The content of the polymerization initiator(s) added in the liquid is preferably 0.5 to 20% by mass, more preferably 1 to 15% by mass and still more preferably 3 to 10% by mass from the viewpoints of stability over time, curing property and curing speed. When the content is too high, the polymerization initiator(s) may precipitate and separate from the liquid over time and may result in deteriorated strength and rubbing resistance of such an ink set after the ink set is cured.

<Colorant>

The ink set of the invention may contain at least one colorant, if necessary. When one of the first and second liquids is first applied to the surface of a recording medium, the colorant(s) is preferably contained in the other in the image forming method of the invention, as described above. In particular, in the case of a method in which the first and second liquids of a two-liquid-type ink set are sequentially ejected in an ink jet recording manner, the liquid first ejected is brought into direct contact with the recording medium and, therefore, causes shot droplet interference. Here, a visible ink component is a colorant. When a liquid including a colorant causes shot droplet interference, the shot droplet interference is visible and results in deteriorated image quality.

The first liquid is preferably applied to the surface of a recording medium in the invention, as will be explained later. In this case, it is preferable that the colorant(s) is contained in the second liquid but is not substantially contained in the first liquid.

Here, the phrase "the colorant(s) is not substantially contained" means that the content of the colorant(s) in the liquid is such that the presence of the colorant(s) in images cannot be perceived. The content of the colorant(s) in the first liquid is generally 1% by mass or less, preferably 0.5% by mass or less, and more preferably 0.1% by mass or less.

The colorant(s) may be contained in at least one of liquids of the ink set of the invention which are other than the first and second liquids. In this case, the at least one liquid containing the colorant(s) preferably further contains the polymerizable compound(s) in the same manner as the second liquid from the viewpoint of suppressing bleeding and shot droplet interference.

The type of the colorant(s) used in the invention is not limited. At least one colorant is appropriately selected from known water-soluble dyes, oil-soluble dyes and pigments so that it provides hue and color density suitable for the usage of the ink set. As mentioned above, the liquids of the ink jet recording ink set of the invention are preferably water-insoluble liquids containing no aqueous solvent from the viewpoints of ink droplet stability and quick drying ability. From this point of view, it is preferable to use at least one of oil-soluble dyes and pigments, which are easily, uniformly dispersed or dissolved in a water-insoluble liquid.

Oil-Soluble Dye

The oil-soluble dye(s) usable in the invention can be any one. Examples of the oil soluble dyes that may be used in the invention are described hereinafter according to their hue.

Examples of yellow dyes include arylazo and heterylazo dyes having at least one phenol, naphthol, aniline, pyrazolone, pyridone or open chain active methylene moiety as a coupling moiety; azomethine dyes having at least one open chain active methylene moiety as a coupling moiety; methine dyes such as benzylidene dyes and monomethineoxonol dyes; quinone dyes such as naphthoquinone dyes and anthraquinone dyes; quinophthalone dyes; nitro and nitroso dyes; acridine dyes; and acridinone dyes.

Examples of magenta dyes include arylazo and heterylazo dyes having at least one phenol, naphthol or aniline moiety as a coupling moiety; azomethine dyes having at least one pyrazolone or pyrazolotriazole moiety as a coupling moiety; methine dyes such as arylidene dyes, styryl dyes, merocyanine dyes and oxonol dyes; carbonium dyes such as diphenylmethane dyes, triphenylmethane dyes and xanthene dyes; condensed polycyclic dyes such as quinone dyes including naphthoquinone, anthraquinone and anthrapyridone; and dioxazine dyes.

Examples of cyan dyes include indoaniline dyes, indophenol dyes, azomethine dyes having at least one pyrrolotriazole moiety as a coupling moiety: polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; arylazo and heterylazo dyes having at least one phenol, naphthol and aniline moiety as a coupling moiety; and indigo and thioindigo dyes.

Each of the aforementioned dyes may be a dye having chromophore which, after a part thereof dissociates, forms a yellow, magenta or cyan color. The counter cation in this case may be an inorganic cation such as an alkali metal ion or an ammonium ion, or an organic cation such as a pyridinium ion or a quaternary ammonium salt, or may be a polymer cation having such a cation as a partial structure thereof.

When at least one oil-soluble dye is used as the colorant(s), the content of the dye(s) in all the solid matters contained in the second liquid is preferably in the range from 0.05 to 20% by mass, more preferably 0.1 to 15% by mass, and still more preferably 0.2 to 6% by mass. The content of the colorant(s) (dye) in all the solid matters contained in each of liquids of the ink jet recording ink set which are other than the first and second liquids is preferably in the range of 0 to 1% by mass.

Pigments

It is also preferable to use at least one pigment as the colorant(s), because pigment particles easily agglomerate at the time that the plural liquids are mixed.

The pigment usable in the invention may be an organic pigment or an inorganic pigment. As for a black pigment, a carbon black pigment is preferably used. Generally, a black pigment and pigments of three primary colors, namely, cyan, magenta and yellow, are usually used. At least one of pigments having other hues such as red, green, blue, brown and white, metallic luster pigments such as gold and silver, and colorless and pale extender pigments may also be used according to the purpose.

Further, at least one of particles each of which has a silica, alumina or resin particle core and a dye or pigment fixed on the surface of the core, insoluble lakes of dyes, colored emulsions, and colored latex may also be used as the pigment(s).

In addition, at least one of pigments coated with at least one resin may also be used. These pigments are called microcapsule pigments and are available as commercial products from, for instance, Dainippon Ink Chemicals, Incorporated and Toyo Ink Mfg. Co., Ltd.

In the invention, the volume average diameter of the pigment particles contained in the liquid is preferably in the range from 10 to 250 nm and more preferably 50 to 200 nm from the viewpoint of well balance between optical density and storage stability. The volume average diameter of the pigment particles can be measured with, for example, a measuring device (e.g., LB-500 manufactured by Horiba, Ltd.).

When at least one pigment is used as the colorant(s), the content of the pigment(s) in all the solid matters contained in the second liquid is preferably in the range from 0.1% by mass to 20% by mass, and more preferably in the range from 1% by mass to 10% by mass from the viewpoints of optical density and jetting stability. The content of the pigment(s) in all the solid matters contained in each of liquids of the ink jet recording ink set which are other than the first and second liquids is preferably in the range of 0 to 1% by mass.

One of these colorants may be used alone, or two or more of them can be used as a mixture thereof. When each of at least two of the plural liquids of the ink jet recording ink set of the invention include at least one colorant, the at least two liquids may contain the same colorant(s) or different colorants.

Hereinafter, the major components in the case where the ink jet recording ink set of the invention is a two-liquid-type ink set including only the first and second liquids will be explained.

It is essential that the first liquid contains the high-boiling point organic solvent(s) and that the second liquid contains the polymerizable compound(s).

(1) The high-boiling point organic solvent(s) may also be contained in the second liquid but, preferably, is not substantially contained in the second liquid.

(2) The polymerizable compound(s) may also be contained in the first liquid but, preferably, is not substantially contained in the first liquid.

(3) The colorant may be contained in either or both of the first and second liquids but, preferably, is contained in the second liquid and, preferably, is not substantially contained in the first liquid.

(4) The polymerization initiator may be contained in either or both of the first and second liquids but, preferably, is contained in the first liquid and, preferably, is not substantially contained in the second liquid.

The plural liquids in the invention may contain at least one of known additives as well as the above components according to the usage of the ink jet recording ink set.

<Other Components>

Storage Stabilizer

In the invention, at least one of the plural liquids may contain at least one storage stabilizer in order to suppress undesirable polymerization during storage. The storage stabilizer(s) and the polymerizable compound(s) are preferably contained in the same liquid(s). The storage stabilizer(s) is preferably soluble in the liquid(s) and other components therein.

Examples of the storage stabilizer include quaternary ammonium salts, hydroxyamines, cyclic amides, nitriles, substituted ureas, heterocyclic compounds, organic acids, hydroquinone, hydroquinone monoethers, organic phosphines and copper compounds. Specific examples of the storage stabilizer include benzyl trimethyl ammonium chloride, diethylhydroxylamine, benzothiazole, 4-amino-2,2,6,6-tetramethylpiperidine, citric acid, hydroquinone monomethyl ether, hydroquinone monobutyl ether and copper naphthenate.

Although the content of the storage stabilizer(s) contained is properly selected on the basis of the activity of the polymerization initiator(s), the polymerization ability of the polymerizable compound(s) and/or the type(s) of the storage stabilizer(s), the content of the storage stabilizer(s) in all the solid matters contained in each of the at least one liquid is preferably 0.005 to 1% by mass, more preferably 0.01 to 0.5% by mass and still more preferably 0.01 to 0.2% by mass from the viewpoint of well balance between the storage stability and the curability of the ink set at the time that the plural liquids are mixed.

Electrically Conductive Salt

Electrically conductive salts are solid compounds for improving electrical conductivity. In the invention, it is preferable that none of the plural liquids substantially contain an electrically conductive salt. This is because the salt is likely to precipitate during storage. However, an electrically conductive salt(s) which has high solubility in liquid can be contained in the liquid(s) in an appropriated amount. Such a salt may be an electrically conductive salt which originally has high solubility or that having improved solubility. Examples of the electrically conductive salt include potassium thiocyanate, lithium nitrate, ammonium thiocyanate and dimethylamine hydrochloride.

Solvent

At least one solvent may be contained in at least one of the plural liquids to regulate the polarity, viscosity, surface tension, electrical conductivity and/or printability of each of the plural liquids and/or to improve the solubility and/or dispersibility of the colorant(s). Each of the at least one solvent is preferably a liquid which is insoluble in water and which does not contain an aqueous solvent from the viewpoint of ink droplet stability and quick drying ability, and more preferably one of the aforementioned first, second and third high-boiling point organic solvents.

A low-boiling point organic solvent having a boiling point of 100° C. or lower may adversely affect curing property and require a measure to prevent environmental pollution. Therefore, it is preferable that such a solvent is not used in the invention. However, when at least one low-boiling point solvent is used in the invention, the solvent is preferably a highly safe solvent. The highly safe solvent means a solvent for which a high control concentration is stipulated. The control concentration is an index shown in the Japanese working environmental evaluation standard. The solvent is preferably one having a control concentration of 100 ppm or higher, and more preferably one having a control concentration of 200 ppm or higher. Examples of the highly safe solvent include alcohols, ketones, esters, ethers and hydrocarbons. Specific examples of the solvent include methanol, 2-butanol, acetone, methyl ethyl ketone, ethyl acetate and tetrahydrofuran.

One of these solvents may be used alone, or two or more of them can be used together. When at least one of water and the low-boiling point organic solvents is used in the invention, the content of the at least one contained in each of the plural liquids is preferably 0 to 20% by mass, more preferably 0 to 10% by mass, and still more preferably substantially zero. Inclusion of water in at least one of the plural liquids is not preferable from the viewpoints of stability over time such as non-uniformity due to progress of time and turbidity of the liquid resulting from precipitation of the dye(s), and quick drying ability of the ink jet recording ink set on a non-water-absorbing recording medium. Here, the phrase "the content of water and/or the low-boiling point organic solvent(s) is substantially zero" means that the presence of unavoidable impurities in the liquid is admitted.

Other Additives

The ink jet recording ink set of the invention may contain at least one of known additives such as polymers, surface tension control agents, ultraviolet ray absorbents, antioxidants, fading preventives and pH control agents.

The surface tension control agent(s), the ultraviolet ray absorbent(s), the antioxidant(s), the fading preventive(s) and the pH control agent(s) may be properly selected from known compounds. Specifically, additives described in, for example, JP-A No. 2001-181549 may be used.

In the invention, compounds that, when mixed, react with each other to produce agglomerates or to thicken liquids containing them may be contained in different liquids, respectively. The compounds can effectively suppress generation of shot droplet interference of adjacent liquid droplets because of the above properties.

Examples of reaction which is caused by these compounds include that between acid and base, hydrogen bonding reaction between carboxylic acid and an amide group-containing compound, cross-linking reaction including that caused by boric acid and diol, and reaction due to electrostatic interaction between cation and anion.

<Ink Jet Image Recording Method>

Next, the ink jet image recording method of the invention will be described.

In the ink jet image recording method of the invention (hereinafter referred to simply as "image recording method" in some cases), the ink jet recording ink set of the invention is used. Specifically, the ink jet image recording method includes: simultaneously or sequentially applying the first liquid and the second liquid to a recording medium to bring the first and second liquids in contact with each other on the recording medium and then form an image.

Bleeding and shot droplet interference can be effectively suppressed by applying the first liquid containing the high-boiling point organic solvent(s) and the second liquid containing the polymerizable compound(s) to the recording medium to bring the first and second liquids in contact with each other on the recording medium.

Unit of Applying Liquid

In the image recording method, all the plural liquids including the first and second liquids are not necessarily applied to a recording medium by jetting from ink nozzles, and may be applied by coating. However, when the colorant(s) is contained in at least one of the plural liquids, it is preferable that the colorant(s) is contained in the second liquid and that the second liquid is jetted by an ink jet nozzle simultaneously during or after the first liquid is applied from the viewpoint of suppressing bleeding and shot droplet interference.

Hereinafter, a unit for applying the first liquid to the surface of the recording medium in the image recording method will be explained. On the other hand, as described above, a unit for applying the second liquid to the recording medium is preferably a jetting unit having an ink jet nozzle, which unit will be described after each of embodiments of the unit for applying the first liquid to the surface of the recording medium.

The unit for applying the first liquid to the surface of the recording medium can be one of the following two units, by which the invention is not limited.

(i) Coater (Unit (i))

Preferably, the first liquid is applied to the recording medium with a coater and the second liquid is then jetted by an ink jet nozzle to form an image in the ink jet image recording method of the invention.

The coater may be appropriately selected from known coaters according to the object. Examples of the coater include an air doctor coater, a blade coater, a rod coater, a knife coater, a squeeze coater, an impregnation coater, a reverse roll coater, a transfer roll coater, a gravure coater, a kiss roll coater, a cast coater, a spray coater, a curtain coater and an extrusion coater. The details of these coaters are obtained with reference to *Coating Engineering* written by Yuji Harasaki.

The aforementioned ink jet nozzle can be appropriately selected from known nozzles according to the object. The ink jet nozzle (ink jet system) will be explained later in detail.

Each of liquids other than the first and second liquids may be applied to the recording medium or the first and/or second liquid on the recording medium with any method including a coating method using a coater, whose examples are the same as the above, and a jetting method using an ink jet nozzle. Moreover, there is no particular limitation to time(s) when these liquids are applied. However, when the colorant(s) is contained in at least one of these liquids, it is preferable to jetting each of the at least one liquid with an ink jet nozzle after the first liquid is applied.

(ii) Jetting Unit Having Ink Jet Nozzle (Unit (ii))

In the invention, it is also preferable that the second liquid is jetted by an ink jet nozzle simultaneously during or after the first liquid is jetted by another ink jet nozzle to form an image.

Each of these ink jet nozzles can be the same as the aforementioned ink jet nozzle.

Each of liquids other than the first and second liquids may be applied to the recording medium or the first and/or second liquid on the recording medium with any method including a coating method using a coater, whose examples are the same as the above, and a jetting method using an ink jet nozzle. Moreover, there is no particular limitation to time(s) when these liquids are applied. However, when the colorant(s) is contained in at least one of these liquids, it is preferable to jetting each of the at least one liquid with an ink jet nozzle after the first liquid is applied.

The ink jet recording ink set of the invention significantly achieves an excellent effect, when it is applied to a recording medium by the ink jet image recording method in which both the first and second liquids are jetted with the ink jet nozzles (the aforementioned unit (ii)).

Hereinafter, a jetting method using an ink jet nozzle (ink jet recording system) will be explained. In the invention, the jetting method can be selected from conventional jetting methods, and is preferably a charge control method that utilizes electrostatic induction force to eject an ink, a drop-on-demand method (pressure pulse method) which utilizes the oscillation pressure of a piezoelectric element, an acoustic ink jet method which utilizes radiation pressure generated by applying acoustic beams, into which electric signals are converted, to an ink to jet an ink or a thermal ink jet (Bubble Jet®) method which utilizes the pressure generated by air bubbles formed by heating an ink.

The ink jet image recording method includes a method which includes jetting multi droplets of a so-called photo-ink having a low concentration which have a small volume from at least one nozzle, a method which uses plural inks having substantially the same hue and different concentrations to improve image quality, and a method which uses a colorless and transparent ink.

In the case of the aforementioned unit (i), at least the second liquid is applied to the recording medium to which the first liquid has been already applied by such an ink jet recording method so as to form an image. In the case of the unit (ii), at least the first liquid and the second liquid are applied to the recording medium simultaneously or sequentially by such an ink jet recording method so as to form an image.

When two or more liquids are jetted on a recording medium by the ink jet recording method, these liquids are applied such that they are in contact with each other on the recording medium. The two or more liquids may be in contact with each other on the recording medium in any manner. For example, these two or more liquids may be jetted such that the corresponding droplets of these liquids are adjacent to each other on the recording medium. Alternatively, these liquids may be jetted such that the corresponding droplets of these liquids are applied to the same area.

The liquids can be jetted in any timing(s), and may be jetted simultaneously or sequentially. When the liquids are jetted sequentially, it is preferable to jet one liquid and then jet the next liquid within one second from the jetting of the one liquid. There is no particular limitation to the mass of one droplet and the mass is properly selected according to desired sharpness which an image to be formed should have. The mass of one droplet of each liquid is preferably about 0.5 pl to about 10 pl.

When the first liquid is jetted by an ink jet nozzle before the jetting of the second liquid in the method using the unit (ii), the first liquid jetted is brought into direct contact with the surface of a recording medium and, therefore, causes shot droplet interference. As a result, the periphery of each droplet of the first liquid is jagged. For this reason, it is preferable that the first liquid substantially contains no colorant from the viewpoint of preventing visible shot droplet interference.

In methods using either of the units (i) and (ii), the second liquid is jetted to a recording medium simultaneously with application of the first liquid or to a recording medium to which the first liquid has been already applied such that the second liquid is in contact with the first liquid on the recording medium. Therefore, the second liquid does not generate shot droplet interference and the dot form of each droplet is kept. From the viewpoint of keeping a better dot form, it is preferable that an area, of a recording medium, to which the first liquid is applied is wider than an area on which the second liquid is jetted after the application of the first liquid.

Given that the amount (mass) of one droplet of the second liquid is 1 in the case of the two-liquid-type ink jet recording ink set, the amount (mass) of one droplet of the first liquid is preferably in the range from 0.05 to 5, more preferably in the range from 0.07 to 1 and still more preferably 0.1 to 1. When the mass ratio of one droplet of the first liquid to that of the second liquid is 5 or lower, good image quality is obtained in view of UV curability and a feeling of relief. When the ratio is 0.05 or higher, shot droplet interference can be satisfactorily prevented.

Desired physical properties of a liquid (ink) jetted to a recording medium by an ink jet recording method depend on the type of the printer used in the method. Generally, the viscosity of each liquid is preferably 5 to 100 mPa·s and more preferably 10 to 80 mPa·s. The surface tension of each liquid is preferably 20 to 60 mN/m and more preferably 30 to 50 mN/m.

The difference between the viscosity of the first liquid and that of the second liquid is preferably within 25 mPa·s. Moreover, the difference between the surface tension of the first liquid and that of the second liquid is preferably within 20 mN/m.

Application of Energy

The image recording method of the invention may include fixing the formed image by applying energy to the image from the viewpoint of obtaining high fixing property. The application of energy accelerates polymerization and curing reaction of the agglomerates, and makes it possible to more effectively form more strengthened image. The energy is preferably applied by irradiating light or heating.

The energy applied by light exposure or heating accelerates generation of active species due to decomposition of the polymerization initiator(s) in the mixture of the liquids, and increases in the amount of the active species and the temperature of the image accelerate the polymerization and curing reaction of the polymerizable compound(s).

A device which emits ultraviolet rays or visible rays may be used as the exposure light source to accelerate the polymerization of the polymerizable compound(s) in the invention. Alternatively, radiation other than light, for example, α-rays, γ-rays, X-rays and electron beams, is applied to the image so as to apply energy thereto. However, irradiation of ultraviolet rays or visible rays is preferable and irradiation of ultraviolet rays is more preferable from the viewpoints of cost and safety. The amount of energy necessary for the curing reaction depends on the type and content of the polymerization initiator(s), and is usually about 1 to 500 mJ/cm$^2$.

When energy is applied by heating, it is preferable to heat the recording medium at a temperature necessary to adjust the surface temperature of the recording medium within the range of 40 to 80° C. for 0.1 to 1 seconds.

This heating is carried out with a non-contact heating unit, and specifically, a heating unit in which the recording medium is made to pass through a heating furnace such as an oven, or a heating unit in which the entire surface of the recording medium is exposed to ultraviolet rays, visible rays, and/or infrared rays is preferably used. Examples of the light source used for the exposure and serving as a heating unit include a metal halide lamp, a xenon lamp, a tungsten lamp, a carbon arc lamp and a mercury lamp.

Recording Medium

In the invention, recording media which an ink can penetrate and recording media which an ink cannot penetrate may be both used. Examples of the former recording media include plain paper, paper exclusive for ink jet recording, coated paper, paper for both of electrophotography and ink jet recording, clothes, non-woven fabric, porous films and high molecular absorbers. These materials are described as "recording materials" in, for example, JP-A No. 2001-1891549.

The excellent effect of invention is significantly obtained in the case of the latter recording media. Examples of such recording media include art paper, synthetic resins, rubbers, paper coated with a resin, glass, metals, ceramics and woods. As recording media which an ink cannot penetrate and which have at least one newly added function, composite materials obtained by combining at least two of these materials may be used.

The synthetic resin may be any of conventional synthetic resins. Examples thereof include polyesters such as polyethylene terephthalate and polybutadiene terephthalate, polyolefins such as polyvinyl chloride, polystyrene, polyethylene, polyurethane and polypropylene, acrylic resins, polycarbonates, acrylonitrile-butadiene-styrene terpolymer, diacetate, triacetate, polyimide, cellophane and celluloid. There is no limitation with respect to the thickness and shape of each of these resin materials and these materials may be in the form of a film, a card or a block. Also, the synthetic resins may be transparent or opaque.

The synthetic resin is preferably used in the form of a film used for so-called soft packaging, and various types of non-absorptive plastic and their films may be used in the invention. Examples of such plastic films include a PET film, an OPS film, an OPP film, a PNy film, a PVC film, a PE film and a TAC film. In addition, the synthetic resin may also be polycarbonate, acrylic resin, ABS, polyacetal, PVA and rubber.

Examples of the paper coated with a resin include a transparent polyester film, an opaque polyester film, an opaque polyolefin resin film, and paper supports, on each of the both surfaces of which a polyolefin resin is laminated. The paper coated with a resin is preferably the above-described paper support.

The metal may be any metal, and is preferably aluminum, iron, gold, silver, copper, nickel, titanium, chrome, molybdenum, silicon, lead, or zinc or a composite material of at least two of these metals such as stainless.

The support used in the ink jet image recording method of the invention may be a read only optical disk such as CD-ROM or DVD-ROM, a write once optical disk such as CD-R or DVD-R, or a rewritable optical disk. The disk may have an ink-receiving layer and a gloss-imparting layer on the label surface side thereof.

EXAMPLES

The invention will be explained in more detail by way of examples, which are not intended to limit the invention.

Example 1

Preparation of Ink Jet Recording Liquid (I-1) Containing Polymerizable Compound

| | |
|---|---|
| (A) Acid compound (compound (A-1) shown below) | 3.56 g |
| (B) Polymerizable compound (DPCA60 manufactured by Nippon Kayaku Co., Ltd.) | 1.07 g |
| (C) Polymerizable compound (1,6-hexanediol diacrylate (HDDA manufactured by Daicel UCB Co., Ltd.) | 8.53 g |
| (D) N-ethyldiethanolamine | 0.29 g |
| (E) Colorant (dye (M-1) shown below) | 0.46 g |

The above components were mixed and stirred, until the solid components in these components were dissolved in the liquid components in these components. A magenta ink jet recording liquid (I-1) was thus obtained. The viscosity of the liquid (I-1) at 25° C. was 19.6 mPa·s.

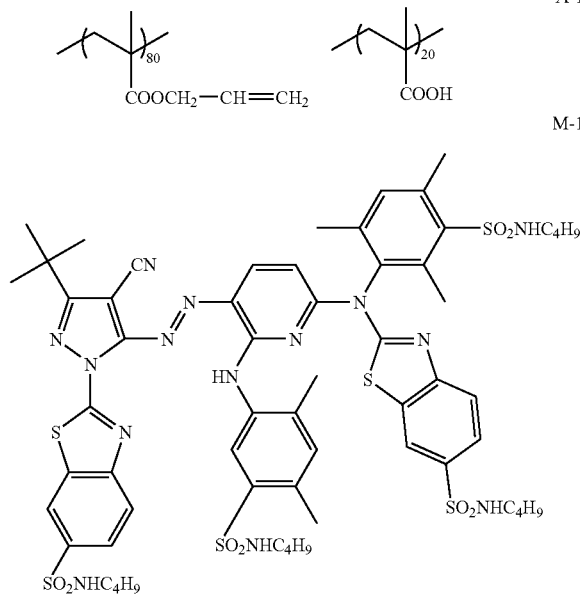

<Preparation of Ink Jet Recording Liquid (II-1) Containing High-Boiling Point Organic Solvent>

| | |
|---|---|
| (F) High-boiling point organic solvent (the aforementioned specific example (S-6)) | 12 g |
| (G) Polymerization initiator (TPO-L (polymerization initiator-1 shown below)) | 1.8 g |

The above components were mixed and stirred, until the solid components in these components were dissolved in the liquid components in these components. An ink jet recording liquid (II-1) was thus obtained.

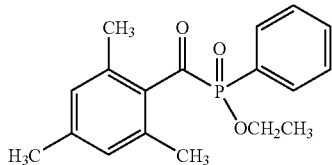

Polymerization initiator-1

<Preparation of Ink Jet Recording Liquids (II-2) to (II-9) Containing High-Boiling Point Organic Solvent>

Ink jet recording liquids (II-2) to (II-9) containing a high-boiling solvent were prepared in the same manner as the ink jet recording liquid (II-1), except that the high-boiling organic solvent (S-6) was replaced with each of organic solvents shown in Table 1. Here, the amounts (weights) of the high-boiling organic solvents in the ink jet recording liquids (II-1) to (II-9) were the same.

The types of the high-boiling point organic solvents used and the viscosities of each of these high-boiling point organic solvents at 25° C. and 60° C. and the boiling point of each of the high-boiling point organic solvents are shown in Table 1.

TABLE 1

| Liquid No. | Type of high-boiling point organic solvent | Viscosity (mPa · s) 25° C. | Viscosity (mPa · s) 60° C. | Boiling point (° C.) |
|---|---|---|---|---|
| II-1 | S-6 | 11.7 | 4.0 | 390 |
| II-2 | S-9 | 6.62 | 3.0 | 365 |
| II-3 | S-27 | 12 | 4.0 | — |
| II-4 | S-14 | 20.3 | 5.1 | 370 |
| II-5 | S-21 | 5.68 | 2.4 | 300 |
| II-6 | S-36 | 9.45 | 3.6 | 340 |
| II-7 | S-42 | 49.65 | 10.4 | — |
| II-8 | S-46 | 35.3 | 8.0 | — |
| II-9 | S-49 | 43.1 | 9.3 | — |

It has been confirmed that those whose boiling points are not shown in Table 1 do not boil at 170° C.

<Preparation of One-Liquid-Type Ink Jet Recording (I-1) for Comparison>

| | |
|---|---|
| (A) Acid compound (aforementioned compound (A-1)) | 3.56 g |
| (B) Polymerizable compound (DPCA60 manufactured by Nippon Kayaku Co., Ltd.) | 1.07 g |
| (C) Polymerizable compound (1,6-hexanediol diacrylate (HDDA manufactured by Daicel UCB Co., Ltd.) | 7.67 g |
| (D) N-ethyldiethanolamine | 0.29 g |
| (E) Colorant (aforementioned dye (M-1)) | 0.46 g |
| (G) Polymerization initiator (TPO-L (aforementioned polymerization initiator-1)) | 1.81 g |

The above components were mixed and stirred, until the solid components in these components were dissolved in the liquid components in these components. A magenta ink jet recording liquid (I-0) was thus obtained. The viscosity of the liquid (I-0) was 19.6 mPa·s at 25° C.

<Preparation of One-Liquid-Type Ink Jet Recording (I-00) for Comparison>

| | |
|---|---|
| (A) Acid compound (aforementioned compound (A-1)) | 3.56 g |
| (B) Polymerizable compound (DPCA60, manufactured by Nippon Kayaku Co., Ltd.) | 1.07 g |
| (C) Polymerizable compound (1,6-hexanediol diacrylate (HDDA manufactured by Daicel UCB Co., Ltd.) | 9.53 g |
| (D) N-ethyldiethanolamine | 0.29 g |
| (E) Colorant (aforementioned dye (M-1)) | 0.46 g |
| (F) High-boiling point organic solvent (aforementioned specific example (S-6)) | 13.10 g |
| (G) Polymerization initiator (TPO-L (aforementioned polymerization initiator-1)) | 1.81 g |

The above components were mixed and stirred, until the solid components in these components were dissolved in the liquid components in these components. A magenta ink jet recording liquid (I-00) was thus obtained. The viscosity of the liquid (I-00) was 19.6 mPa·s at 25° C.

<Preparation of Ink Jet Recording Liquid (II-0) for Comparison Containing High-Boiling Point Organic Solvent>

An ink jet recording liquid (II-0) for comparison containing a high-boiling point organic solvent was prepared in the same manner as the ink jet recording liquid (II-1), except that the high-boiling point organic solvent (S-6) was replaced by liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (S-6) replaced.

<Evaluation>

First, printing using each of the prepared one-liquid-type liquids will be explained.

The prepared ink jet recording liquid (I-0) was used to print an image on a recording medium with an ink jet printer having 64 nozzles which were arrayed into two rows (experimental device, or INK JET EXPERIMENTAL SYSTEM IJET1000R manufactured by Micro Jet) at a printing density of 300 dpi at a droplet ejection frequency of 2 kHz.

The prepared ink jet recording liquid (I-00) was used to print an image on a recording medium in the same manner as the ink jet recording liquid (I-0), except that the droplet ejection frequency was changed to 4 kHz.

Next, printing using each of the prepared two-liquid-type liquids will be explained.

First, each of the prepared ink jet recording liquids (II-1) to (II-9) and (II-0) was jetted on a recording medium in the same manner as the ink jet recording liquid (I-0). The ink jet recording liquid (I-1) was then jetted such that droplets thereof overlapped with the corresponding droplets of each of the ink jet recording liquids (II-1) to (II-9) and (II-0). The jetting of each of these liquids was carried out with an ink jet printer having 64 nozzles which were arrayed into two rows (experimental device, or INK JET EXPERIMENTAL SYSTEM IJET1000R manufactured by Micro Jet) at a printing density of 300 dpi at a droplet ejection frequency of 2 kHz.

Here, the jetting of each of the ink jet recording liquids (II-1) to (II-9) and (II-0) was conducted on each of two types of recording media. The recording media were a polyethylene terephthalate (PET) sheet having a thickness of 60 μm (PPL/LASER PRINTER XEROX FILM (OHP FILM) manufactured by Fuji Xerox Co., Ltd.) and art paper (TOKUHISHI ART DUPLEX manufactured by Mitsubishi Paper Mills, Ltd.).

After the jetting, the surface of the recording medium to which surface the ink set had been applied was exposed to ultraviolet rays emitted by a metal halide lamp and having a wavelength of 365 nm at a light exposure of 500 mJ/cm$^2$ or less, thereby forming an image. The image was evaluated as to the following items.

<Evaluation of Resistance to Shot Droplet Interference>

Line Quality

Line quality (degree of bleeding) of an image obtained by jetting each two-liquid-type or one-liquid-type ink was evaluated as follows. Here, the image was formed in the above manner under the following conditions. When the ink used to form the image was a two-liquid-type one, each of the ink jet recording liquids (II-1) to (II-9) and (II-0) was jetted on a recording medium into five rows, all the adjacent rows of which were in contact with each other. When ten seconds lapsed since the jetting of each of the above ink jet recording liquids, the ink jet recording liquid (I-1) was jetted in a row, which overlapped with at least one of the above five rows. When the ink used to form the image was a one-liquid-type one (ink jet recording inks (I-0) and (I-00)), each of the ink jet recording liquids was jetted on a recording medium in a row. The evaluation was conducted on the basis of the following criteria.

A: The line has a uniform width.

B: The line has a slightly uneven width due to liquid puddle.

C: The line has a considerably uneven width due to liquid puddle.

Solid Image Quality

Solid image quality (degree of density unevenness) of an image obtained by jetting each two-liquid-type or one-liquid-type ink was evaluated as follows. Here, the image was formed in the above manner under the following conditions. When the ink used to form the image was a two-liquid-type one, each of the ink jet recording liquids (II-1) to (II-9) and (II-0) was jetted on a recording medium into sixty rows, all the adjacent rows of which were in contact with each other. When ten seconds lapsed since the jetting of each of the above ink jet recording liquids, the ink jet recording liquid (I-1) was jetted into fifty rows, all the adjacent rows of which were in contact with each other and which overlapped with the area formed by the above sixty rows. When the ink used to form the image was a one-liquid-type one (ink jet recording inks (I-0) and (I-00)), each of the ink jet recording liquids was jetted on a recording medium to form a solid image. The evaluation was conducted on the basis of the following criteria.

A: The solid image has no or almost no density unevenness.

B: The solid image has slight density unevenness which is at a practically acceptable level.

C: The solid image has considerable density unevenness and poor quality.

<Evaluation of Feeling of Wet (Rapid Drying Property)>

The image was touched with a finger and the degree of wet of the image was determined on the basis of the following criteria.

A: The image is not wet.

B: The image is slightly wet.

C: The image is considerably wet.

<Evaluation of Rubbing Resistance>

An image was formed by jetting each ink on each of a PET sheet and art paper in the above manner. When 30 minutes lapsed since the image formation, the image portion(s) of the image was rubbed with an eraser by moving the eraser back and forth ten times. The degree of image density decrease after the rubbing was determined on the basis of the following criteria.

A: The image density after the rubbing is not different from that before the rubbing.

B: The difference between the image density before the rubbing and that after the rubbing is small.

C: The difference between the image density before the rubbing and that after the rubbing is big.

<Evaluation of Light Resistance>

The density of an image portion of an image formed on each of a PET sheet and art paper was measured with an X-RITE 310 densitometer manufactured by X-rite Company. The surface of each of the PET sheet and the art paper on which surface the image was formed was irradiated with xenon light emitted by a weather meter (i.e., ATRAS C. I65) at 85,000 Lux for one week. Thereafter, the density of the image portion was measured with the X-RITE 310 densitometer again. The colorant remaining rate was calculated from the measured values and light resistance of the image was evaluated on the basis of the following criteria. Here, the image portion used in the measurement was so selected as to obtain a reflection density of 1.0 or less.

A: The colorant remaining rate is 90% or more.

B: The colorant remaining rate is not less than 80% and less than 90%.

C: The colorant remaining rate is not less than 70% and less than 80%.

D: The colorant remaining rate is not less than 50% and less than 70%.

E: The colorant remaining rate is less than 50%.

<Ozone Resistance>

The density of an image portion of an image formed on each of a PET sheet and art paper was measured with an X-RITE 310 densitometer manufactured by X-rite Company. The PET sheet and the art paper were respectively stored in an environment having an ozone concentration of 5.0 ppm for one week. Thereafter, the density of the image portion was measured with the X-RITE 310 densitometer again. The colorant remaining rate was calculated from the measured values and ozone resistance of the image was evaluated on the basis of the following criteria.

A: The colorant remaining rate is 90% or more.

B: The colorant remaining rate is not less than 80% and less than 90%.

C: The colorant remaining rate is not less than 70% and less than 80%.

D: The colorant remaining rate is not less than 50% and less than 70%.

E: The colorant remaining rate is less than 50%.

The evaluation results are shown in Table 2.

TABLE 2

| Liquid | Recording medium | Line quality | Solid image quality | Feeling of wet | Rubbing resistance | Light resistance | Ozone resistance | Remarks |
|---|---|---|---|---|---|---|---|---|
| I-1/II-1 | PET | A | A | A | A | B | B | The Invention |
|  | Art paper | A | A | A | A | B | B | The Invention |
| I-1/II-2 | PET | A | A | A | A | B | B | The Invention |
|  | Art paper | A | A | A | A | B | B | The Invention |
| I-1/II-3 | PET | A | A | A | A | B | B | The Invention |
|  | Art paper | A | A | A | A | B | B | The Invention |
| I-1/II-4 | PET | A | B | A | A | B | B | The Invention |
|  | Art paper | A | B | A | A | B | B | The Invention |
| I-1/II-5 | PET | A | B | A | A | B | B | The Invention |
|  | Art paper | A | B | A | A | B | B | The Invention |
| I-1/II-6 | PET | A | B | A | A | B | B | The Invention |
|  | Art paper | A | B | A | A | B | B | The Invention |
| I-1/II-7 | PET | A | B | A | A | B | B | The Invention |
|  | Art paper | A | B | A | A | B | B | The Invention |
| I-1/II-8 | PET | A | B | A | A | B | B | The Invention |
|  | Art paper | A | B | A | A | B | B | The Invention |
| I-1/II-9 | PET | A | B | A | A | B | B | The Invention |
|  | Art paper | A | B | A | A | B | B | The Invention |
| I-0 | PET | C | C | A | A | B | B | Comparative Example |
|  | Art paper | B | C | A | A | B | B | Comparative Example |
| I-00 | PET | C | C | A | A | B | B | Comparative Example |
|  | Art paper | B | C | A | A | B | B | Comparative Example |
| I-1/II-0 | PET | C | C | A | A | B | B | Comparative Example |
|  | Art paper | B | C | A | A | B | B | Comparative Example |

As is clear from Table 2, when the two-liquid-type ink jet recording ink of the invention is used to form an image on a recording medium (i.e., PET sheet or art paper which does not absorb ink), specifically, when one liquid containing at least one polymerizable compound and another liquid containing at least one high-boiling point organic solvent are so jetted as to bring the both liquids into contact with each other on the recording medium, the image formation is promptly conducted on each of the PET sheet and the art paper without shot droplet interference. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

On the other hand, in the case of the samples obtained by jetting one-liquid-type ink, the following has been found. A stable image quality such as no feeling of wet, high rubbing resistance, high light resistance and high ozone resistance can be obtained. However, shot droplet interference appears on the PET sheet or on the art paper, and this one-liquid-type ink has an insufficient image-forming property, and cannot provide an image having high quality.

Similarly, in the case of the two-liquid-type comparative ink containing a highly viscous solvent, shot droplet interference appears on the PET sheet or on the art paper, and this type of ink has an insufficient image-forming property, and cannot provide an image having high quality.

Example 2

An ink set was prepared and evaluated in the same manner as in Example 1, except that the dye (M-1) was replaced with a pigment, or phthalocyanine. The formulation of a liquid containing the pigment will be shown below.

<Preparation of Ink Jet Recording Liquid (III-1) Containing Polymerizable Compound>

| | |
|---|---|
| (A) Acid compound (aforementioned compound (A-1)) | 0.22 g |
| (B) Polymerizable compound (DPCA60 manufactured by Nippon Kayaku Co., Ltd.) | 0.38 g |
| (C) Polymerizable compound (1,6-hexanediol diacrylate, or HDDA manufactured by Daicel UCB Co., Ltd.) | 11.70 g |
| (D) N-ethyldiethanolamine | 0.20 g |
| (E) Colorant (pigment, namely copper phthalocyanine (PB 15:3)) (IRGALITE BLUE GLO manufactured by Ciba Specialty Chemicals Co., Ltd.) | 1.40 g |

The above components were mixed and stirred, until the solid components in these components were dissolved in the liquid components in these components. A cyan ink jet recording liquid (III-1) was thus obtained. The viscosity of the liquid (III-1) at 25° C. was 19.8 mPa·s.

Before the mixing, the pigment was dispersed in 1,6-hexanediol diacrylate containing SOLSPERS 3200 (manufactured by Zeneka (k.k.) serving as a dispersant with a ball mill (having a ball mill pot made of hard glass and a ball mill rotary stand one-stage type-A type, and manufactured by Horie Shokai) to prepare a dispersion liquid having a pigment concentration of 20% by mass. The pigment was used in the form of the dispersion liquid in the mixing.

Here, aforementioned 1.40 g was the amount of the pigment rather than that of the dispersion liquid.

<Preparation of One-Liquid-Type Ink Jet Recording (III-0) for Comparison>

| | |
|---|---|
| (A) Acid compound (aforementioned compound (A-1)) | 0.22 g |
| (B) Polymerizable compound (DPCA60 manufactured by Nippon Kayaku Co., Ltd.) | 0.38 g |
| (C) Polymerizable compound (1,6-hexanediol diacrylate, or HDDA manufactured by Daicel UCB Co., Ltd.) | 10.89 g |
| (D) N-ethyldiethanolamine | 0.20 g |
| (E) Colorant (pigment, namely copper phthalocyanine (PB 15:3)) (IRGALITE BLUE GLO manufactured by Ciba Specialty Chemicals Co., Ltd.) | 1.40 g |
| (G) Polymerization initiator (TPO-L (aforementioned polymerization initiator-1)) | 1.81 g |

The above components were mixed and stirred, until the solid components in these components were dissolved in the liquid components in these components. A cyan ink jet recording liquid (III-0) was thus obtained. The viscosity of the liquid (III-0) at 25° C. was 19.6 mPa·s.

Before the mixing, the pigment was dispersed in 1,6-hexanediol diacrylate containing SOLSPERS 3200 (manufactured by Zeneka (k.k.) serving as a dispersant with a ball mill (having a ball mill pot made of hard glass and a ball mill rotary stand one-stage type-A type, and manufactured by Horie Shokai) to prepare a dispersion liquid having a pigment concentration of 20% by mass. The pigment was used in the form of the dispersion liquid in the mixing.

Here, aforementioned 1.40 g was the amount of the pigment rather than that of the dispersion liquid.

<Preparation of One-Liquid-Type Ink Jet Recording (III-00) for Comparison>

| | |
|---|---|
| (A) Acid compound (aforementioned compound (A-1)) | 0.22 g |
| (B) Polymerizable compound (DPCA60 manufactured by Nippon Kayaku Co., Ltd.) | 0.38 g |
| (C) Polymerizable compound (1,6-hexanediol diacrylate, or HDDA manufactured by Daicel UCB Co., Ltd.) | 12.70 g |
| (D) N-ethyldiethanolamine | 0.20 g |
| (E) Colorant (pigment, namely copper phthalocyanine (PB 15:3)) (IRGALITE BLUE GLO manufactured by Ciba Specialty Chemicals Co., Ltd.) | 1.40 g |
| (F) High-boiling point organic solvent (aforementioned specific example (S-6)) | 13.10 g |
| (G) Polymerization initiator (TPO-L (aforementioned polymerization initiator-1)) | 1.81 g |

The above components were mixed and stirred, until the solid components in these components were dissolved in the liquid components in these components. A cyan ink jet recording liquid (III-00) was thus obtained. The viscosity of the liquid (III-00) at 25° C. was 19.6 mPa·s.

Before the mixing, the pigment was dispersed in 1,6-hexanediol diacrylate containing SOLSPERS 3200 (manufactured by Zeneka (k.k.) serving as a dispersant with a ball mill (having a ball mill pot made of hard glass and a ball mill rotary stand one-stage type-A type, and manufactured by Horie Shokai) to prepare a dispersion liquid having a pigment concentration of 20% by mass. The pigment was used in the form of the dispersion liquid in the mixing.

Here, aforementioned 1.40 g was the amount of the pigment rather than that of the dispersion liquid.

Images were printed on recording media and evaluated in the same manner as in Example 1, except that the ink jetrecording liquids (III-1), (III-0) and (III-00) were used in place of the ink jet recording liquids (I-1), (I-0) and (I-00).

The results are shown in Table 3.

TABLE 3

| Liquid | Recording medium | Line quality | Solid image quality | Feeling of wet | Rubbing resistance | Light resistance | Ozone resistance | Remarks |
|---|---|---|---|---|---|---|---|---|
| III-1/II-1 | PET | A | A | A | A | A | A | The Invention |
|  | Art paper | A | A | A | A | A | A | The Invention |
| III-1/II-2 | PET | A | A | A | A | A | A | The Invention |
|  | Art paper | A | A | A | A | A | A | The Invention |
| III-1/II-3 | PET | A | A | A | A | A | A | The Invention |
|  | Art paper | A | A | A | A | A | A | The Invention |
| III-1/II-4 | PET | A | A | A | A | A | A | The Invention |
|  | Art paper | A | A | A | A | A | A | The Invention |
| III-1/II-5 | PET | A | A | A | A | A | A | The Invention |
|  | Art paper | A | A | A | A | A | A | The Invention |
| III-1/II-6 | PET | A | A | A | A | A | A | The Invention |
|  | Art paper | A | A | A | A | A | A | The Invention |
| III-1/II-7 | PET | A | A | A | A | A | A | The Invention |
|  | Art paper | A | A | A | A | A | A | The Invention |
| III-1/II-8 | PET | A | A | A | A | A | A | The Invention |
|  | Art paper | A | A | A | A | A | A | The Invention |
| III-1/II-9 | PET | A | A | A | A | A | A | The Invention |
|  | Art paper | A | A | A | A | A | A | The Invention |
| III-0 | PET | C | C | A | A | A | A | Comparative Example |
|  | Art paper | B | C | A | A | A | A | Comparative Example |
| III-00 | PET | C | C | A | A | A | A | Comparative Example |
|  | Art paper | B | C | A | A | A | A | Comparative Example |
| III-1/II-0 | PET | C | C | A | A | A | A | Comparative Example |
|  | Art paper | B | C | A | A | A | A | Comparative Example |

As is clear from Table 3, an image can be formed promptly without shot droplet interference even in the case where a pigment is used as the colorant of an ink, as in the case where a dye is used as the colorant. This is because the ink further contains a high-boiling point organic solvent recited in the invention. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

Furthermore, containing a pigment as the colorant further improves light resistance and ozone resistance. In addition, this can also provide an image without unevenness, even if the high-boiling point organic solvent, which results in slight unevenness in Example 1 using a dye as the colorant, is contained in the liquid.

Comparative Example

A liquid having the following composition was prepared. The liquid was evaluated in the same manner as in Example 1. The results are shown in Table 4.

<Preparation of Ink Jet Recording Liquid I-X for Comparison>

| | | |
|---|---|---|
| (A) | UNIDICK SI-929 (manufactured by Dainippon Ink and Chemicals, Incorporated) | 20 g |
| (B) | Dye X shown below | 1.5 g |
| (C) | Water | 68.5 cc |
| (D) | Glycerin (Wako Pure Chemical Industries, Ltd.) | 10 g |

<Preparation of Ink Jet Recording Liquid II-X for Comparison>

| | | |
|---|---|---|
| (A) | Water | 97 cc |
| (B) | DAIROCURE 2529 (Merck Co., Ltd.) | 3 g |

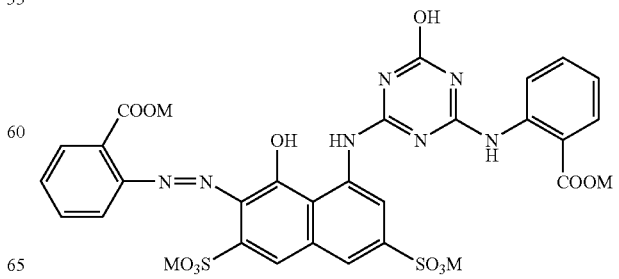

Dye X

TABLE 4

| Liquid | Recording medium | Line quality | Solid image quality | Feeling of wet | Rubbing resistance | Light resistance | Ozone resistance | Remarks |
|---|---|---|---|---|---|---|---|---|
| I-X/II-X | PET | C | C | A | A | C | C | Comparative Example |
| | Art paper | C | C | A | A | C | C | Comparative Example |

As is understood from Table 4, a recording method using, as the solvent, water rather than the high-boiling point organic solvent recited in the invention results in lines having uneven widths, solid image with density unevenness and poor light resistance and ozone resistance, regardless of use of a combination of one liquid containing a photo-curable resin and another liquid containing a photopolymerization initiator.

Example 3

Images were printed on recording media and evaluated in the same manner as in Example 2, except that the two-liquid-type ink jet recording liquids (III-1), (II-1) to (II-9) and (II-0) were used and except that the liquids (II-1) to (II-9) and (II-0) were applied to the recording media with a rod coater (manufactured by (k.k.) Matsubo). Example 3 could provide evaluation results similar to those in Example 2.

Example 4

Preparation of Ink Jet Recording Liquid (I-1) Containing Polymerizable Compound and High-Boiling Point Organic Solvent A magenta ink jet recording liquid (I-1) was prepared in the same manner as the ink jet recording liquid (I-1) used in Example 1, except that the following compound (F) was added to the composition of the ink jet recording liquid (I-1). The viscosity of the liquid (I-1) at 25° C. was 19.6 mPa·s.

| | |
|---|---|
| (F) High-boiling point organic solvent (aforementioned specific example (S-6)) | 1.00 g |

<Preparation of Ink Jet Recording Liquids (I-2) to (I-9) Containing Polymerizable Compound and High-Boiling Point Organic Solvent>

Magenta ink jet recording liquids (i-2) to (i-9) were prepared in the same manner as the ink jet recording liquid (i-1), except that the high-boiling point organic solvent was replaced with each of compounds shown in Table 5. Here, the amounts (weights) of the high-boiling organic solvents in the ink jet recording liquids (i-1) to (i-9) were the same.

The types of the high-boiling point organic solvents used and the viscosities of each of these high-boiling point organic solvents at 25° C. and 60° C. and the boiling point of each of the high-boiling point organic solvents are shown in Table 5.

TABLE 5

| Liquid | Type of high-boiling point organic solvent | Viscosity (mPa·s) 25° C. | 60° C. | Boiling point (° C.) |
|---|---|---|---|---|
| i-1 | S-6 | 11.7 | 4.0 | 390 |
| i-2 | S-9 | 6.62 | 3.0 | 365 |

TABLE 5-continued

| Liquid | Type of high-boiling point organic solvent | Viscosity (mPa·s) 25° C. | 60° C. | Boiling point (° C.) |
|---|---|---|---|---|
| i-3 | S-27 | 12 | 4.0 | — |
| i-4 | S-14 | 20.3 | 5.1 | 370 |
| i-5 | S-21 | 5.68 | 2.4 | 300 |
| i-6 | S-36 | 9.45 | 3.6 | 340 |
| i-7 | S-42 | 49.65 | 10.4 | — |
| i-8 | S-46 | 35.3 | 8.0 | — |
| i-9 | S-49 | 43.1 | 9.3 | — |

It has been confirmed that those whose boiling points are not shown in Table 5 do not boil at 170° C.

<Preparation of Ink Jet Recording Liquids (ii-1) to (ii-9) Containing High-Boiling Point Organic Solvent>

Ink jet recording liquids (ii-1) to (ii-9) containing a high-boiling point organic solvent recited in the invention were prepared in the same manner as the ink jet recording liquids (II-1) to (II-9) used in Example 1.

<Preparation of One-Liquid-Type Ink Jet Recording Liquids (i-0) to (i-00) for Comparison>

Magenta ink jet recording liquids (i-0) and (i-00) were prepared in the same manner as the ink jet recording liquids (I-0) and (I-00) used in Example 1.

<Preparation of Ink Jet Recording Liquid (i-000) for Comparison Containing Polymerizable Compound and High-Boiling Point Organic Solvent>

An ink jet recording liquid (i-000) for comparison containing a high-boiling point organic solvent and polymerizable compounds was prepared in the same manner as the ink jet recording liquid (i-1), except that the high-boiling point organic solvent was replaced with liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (S-6) replaced.

<Preparation of Ink Jet Recording Liquid (ii-000) for Comparison Containing High-Boiling Point Organic Solvent>

An ink jet recording liquid (ii-000) for comparison containing a high-boiling point organic solvent was prepared in the same manner as the ink jet recording liquid (ii-1), except that the high-boiling point organic solvent was replaced with liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (S-6) replaced.

<Evaluation>

Each of the ink jet recording liquids (I-0) and (I-00) was used to print an image on a recording medium in the same manner as in the ink jet recording liquids (I-0) and (I-00) in Example 1.

Next, printing using each of the prepared two-liquid-type liquids will be explained.

First, each of the prepared ink jet recording liquids (ii-1) to (ii-9) and (ii-000) was jetted on a recording medium in the same manner as the ink jet recording liquid (I-0). Each of the ink jet recording liquids (ii-1) to (ii-9) and (ii-000) was then jetted such that droplets thereof overlapped with the corresponding droplets of the corresponding ink jet recording liquid shown in Table 6 or 7. The jetting of each of these liquids was carried out with an ink jet printer having 64 nozzles which were arrayed into two rows (experimental device, or INK JET EXPERIMENTAL SYSTEM IJET1000R manufactured by Micro Jet) at a printing density of 300 dpi at a droplet ejection frequency of 2 kHz.

The recording media used were the same as those in Example 1.

After the jetting, the surface of the recording medium to which surface the ink set had been applied was exposed to ultraviolet rays emitted by a metal halide lamp and having a wavelength of 365 nm at a light exposure of 500 mJ/cm$^2$ or less, thereby forming an image. The image was evaluated in the same manner as in Example 1. Further, a feeling of wet of the image after storage was evaluated as follows.

<Evaluation of Feeling of Wet After Storage>

The recording medium having thereon the image was stored under wet and hot conditions (80° C. and 70% RH) for one week. Thereafter, the image was touched with a finger and the degree of wet of the image was determined on the basis of the following criteria.

A: The image is not wet.

B: The image is slightly wet.

C: The image is considerably wet.

TABLE 6

| Liquid | Recording medium | Line quality | Solid image quality | Feeling of wet | Feeling of wet after storage | Rubbing resistance | Light resistance | Ozone resistance | Remarks |
|---|---|---|---|---|---|---|---|---|---|
| i-1/ii-1 | PET | A | A | A | B | A | B | B | The Invention |
|  | Art paper | A | A | A | B | A | B | B | The Invention |
| i-2/ii-2 | PET | A | A | A | B | A | B | B | The Invention |
|  | Art paper | A | A | A | B | A | B | B | The Invention |
| i-3/ii-3 | PET | A | A | A | B | A | B | B | The Invention |
|  | Art paper | A | A | A | B | A | B | B | The Invention |
| i-4/ii-4 | PET | A | B | A | B | A | B | B | The Invention |
|  | Art paper | A | B | A | B | A | B | B | The Invention |
| i-5/ii-5 | PET | A | B | A | B | A | B | B | The Invention |
|  | Art paper | A | B | A | B | A | B | B | The Invention |
| i-6/ii-6 | PET | A | B | A | B | A | B | B | The Invention |
|  | Art paper | A | B | A | B | A | B | B | The Invention |
| i-7/ii-7 | PET | A | B | A | B | A | B | B | The Invention |
|  | Art paper | A | B | A | B | A | B | B | The Invention |
| i-8/ii-8 | PET | A | B | A | B | A | B | B | The Invention |
|  | Art paper | A | B | A | B | A | B | B | The Invention |
| i-9/ii-9 | PET | A | B | A | B | A | B | B | The Invention |
|  | Art paper | A | B | A | B | A | B | B | The Invention |
| i-1/ii-2 | PET | A | A | A | B | A | B | B | The Invention |
|  | Art paper | A | A | A | B | A | B | B | The Invention |
| i-1/ii-7 | PET | A | B | A | B | A | B | B | The Invention |
|  | Art paper | A | B | A | B | A | B | B | The Invention |
| i-2/ii-4 | PET | A | A | A | B | A | B | B | The Invention |
|  | Art paper | A | A | A | B | A | B | B | The Invention |
| i-7/ii-1 | PET | A | A | A | B | A | B | B | The Invention |
|  | Art paper | A | A | A | B | A | B | B | The Invention |

TABLE 7

| Liquid | Recording medium | Line quality | Solid image quality | Feeling of wet | Feeling of wet after storage | Rubbing resistance | Light resistance | Ozone resistance | Remarks |
|---|---|---|---|---|---|---|---|---|---|
| i-0 | PET | C | C | A | A | A | B | B | Comparative Example |
|  | Art paper | B | C | A | A | A | B | B | Comparative Example |
| i-00 | PET | C | C | A | A | A | B | B | Comparative Example |
|  | Art paper | B | C | A | A | A | B | B | Comparative Example |
| i-000/ii-000 | PET | C | C | A | B | A | B | B | Comparative Example |
|  | Art paper | B | C | A | B | A | B | B | Comparative Example |

As is clear from Tables 6 and 7, when the two-liquid-type ink jet recording ink of the invention is used to form an image on a recording medium (i.e., PET sheet or art paper which does not absorb ink), specifically, when one liquid containing at least one polymerizable compound and another liquid containing at least one high-boiling point organic solvent are so jetted as to bring the both liquids into contact with each other on the recording medium, the image formation is promptly conducted on each of the PET sheet and the art paper without shot droplet interference. Moreover, it has been found that irradiating the recording medium with ultraviolet rays emitted by a metal halide lamp and having a wavelength of 365 nm at light exposure of 500 mJ/cm² or less in the invention rapidly and efficiently accelerates curing reaction to provide an image having an excellent printing property, no feeling of wet, high rubbing resistance, high light resistance and high ozone resistance.

On the other hand, in the case of the samples obtained by jetting one-liquid-type ink, the following has been found. A stable image quality such as no feeling of wet, high rubbing resistance, high light resistance and high ozone resistance can be obtained. However, shot droplet interference appears on the PET sheet or on the art paper, and this one-liquid-type ink has an insufficient image-forming property, and cannot provide an image having high quality.

Similarly, in the case of the two-liquid-type comparative ink containing a highly viscous solvent, shot droplet interference appears on the PET sheet or on the art paper, and this type of ink has an insufficient image-forming property, and cannot provide an image having high quality.

Example 5

An ink set was prepared and evaluated in the same manner as in Example 4, except that the dye (M-1) was replaced with a pigment, or phthalocyanine. The formulation of a liquid containing the pigment will be shown below.
<Preparation of Ink Jet Recording Liquid (iii-1) Containing Polymerizable Compound and High-Boiling Point Organic Solvent>
A cyan ink jet recording liquid (iii-1) was prepared in the same manner as the ink jet recording liquid (III-1) used in Example 2, except that the following compound (F) was added to the composition of the ink jet recording liquid (III-1) used in Example 2. The viscosity of the liquid (iii-1) at 25° C. was 19.8 mPa·s.

| (F) High-boiling point organic solvent (aforementioned specific example (S-6)) | 1.00 g |
|---|---|

<Preparation of Ink Jet Recording Liquids (iii-2) to (iii-9) Containing Polymerizable Compound and High-Boiling Point Organic Solvent>

Ink jet recording liquids (iii-2) to (iii-9) were prepared in the same manner as the ink jet recording liquid (iii-1), except that the high-boiling point organic solvent was replaced with each of compounds shown in Table 8. The amounts (weights) of the ink jet recording liquids (iii-1) to (iii-9) were the same.

The types of the high-boiling point organic solvents used and the viscosities of each of these high-boiling point organic solvents at 25° C. and 60° C. and the boiling point of each of the high-boiling point organic solvents are shown in Table 8.

TABLE 8

| Liquid | Type of high-boiling point organic solvent | Viscosity (mPa·s) 25° C. | Viscosity (mPa·s) 60° C. | Boiling point (° C.) |
|---|---|---|---|---|
| iii-1 | S-6 | 11.7 | 4.0 | 390 |
| iii-2 | S-9 | 6.62 | 3.0 | 365 |
| iii-3 | S-27 | 12 | 4.0 | — |
| iii-4 | S-14 | 20.3 | 5.1 | 370 |
| iii-5 | S-21 | 5.68 | 2.4 | 300 |
| iii-6 | S-36 | 9.45 | 3.6 | 340 |
| iii-7 | S-42 | 49.65 | 10.4 | — |
| iii-8 | S-46 | 35.3 | 8.0 | — |
| iii-9 | S-49 | 43.1 | 9.3 | — |

It has been confirmed that those whose boiling points are not shown in Table 8 do not boil at 170° C.
<Preparation of One-Liquid-Type Ink Jet Recording Liquids (iii-0) and (iii-00) for Comparison>
Cyan ink jet recording liquids (iii-0) and (iii-00) were respectively prepared in the same manner as the ink jet recording liquids (III-0) and (III-00) used in Example 2.
<Preparation of Ink Jet Recording Liquid (iii-000) for Comparison Containing Polymerizable Compound and High-Boiling Point Organic Solvent>
An ink jet recording liquid (iii-000) for comparison containing polymerizable compounds and a high-boiling point organic solvent was prepared in the same manner as the ink jet recording liquid (iii-1), except that the high-boiling point organic solvent was replaced with liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (S-6) replaced.

Images were printed on recording media and evaluated in the same manner as in Example 4, except that the ink jet recording liquids (iii-1), (iii-0), (iii-00) and (iii-000) were used in place of the ink jet recording liquids (I-1), (I-0), (I-00) and (I-000). The results are shown in Tables 9 and 10.

TABLE 9

| Liquid | Recording medium | Line quality | Solid image quality | Feeling of wet | Feeling of wet after storage | Rubbing resistance | Light resistance | Ozone resistance | Remarks |
|---|---|---|---|---|---|---|---|---|---|
| iii-1/ii-1 | PET | A | A | A | B | A | A | A | The Invention |
| | Art paper | A | A | A | B | A | A | A | The Invention |
| iii-2/ii-2 | PET | A | A | A | B | A | A | A | The Invention |
| | Art paper | A | A | A | B | A | A | A | The Invention |
| iii-3/ii-3 | PET | A | A | A | B | A | A | A | The Invention |
| | Art paper | A | A | A | B | A | A | A | The Invention |
| iii-4/ii-4 | PET | A | A | A | B | A | A | A | The Invention |
| | Art paper | A | A | A | B | A | A | A | The Invention |
| iii-5/ii-5 | PET | A | A | A | B | A | A | A | The Invention |
| | Art paper | A | A | A | B | A | A | A | The Invention |

TABLE 9-continued

| Liquid | Recording medium | Line quality | Solid image quality | Feeling of wet | Feeling of wet after storage | Rubbing resistance | Light resistance | Ozone resistance | Remarks |
|---|---|---|---|---|---|---|---|---|---|
| iii-6/ii-6 | PET | A | A | A | B | A | A | A | The Invention |
|  | Art paper | A | A | A | B | A | A | A | The Invention |
| iii-7/ii-7 | PET | A | A | A | B | A | A | A | The Invention |
|  | Art paper | A | A | A | B | A | A | A | The Invention |
| iii-8/ii-8 | PET | A | A | A | B | A | A | A | The Invention |
|  | Art paper | A | A | A | B | A | A | A | The Invention |
| iii-9/ii-9 | PET | A | A | A | B | A | A | A | The Invention |
|  | Art paper | A | A | A | B | A | A | A | The Invention |
| iii-1/ii-2 | PET | A | A | A | B | A | A | A | The Invention |
|  | Art paper | A | A | A | B | A | A | A | The Invention |
| iii-1/ii-7 | PET | A | A | A | B | A | A | A | The Invention |
|  | Art paper | A | A | A | B | A | A | A | The Invention |
| iii-2/ii-4 | PET | A | A | A | B | A | A | A | The Invention |
|  | Art paper | A | A | A | B | A | A | A | The Invention |
| iii-7/ii-1 | PET | A | A | A | B | A | A | A | The Invention |
|  | Art paper | A | A | A | B | A | A | A | The Invention |

TABLE 10

| Liquid | Recording medium | Line quality | Solid image quality | Feeling of wet | Feeling of wet after storage | Rubbing resistance | Light resistance | Ozone resistance | Remarks |
|---|---|---|---|---|---|---|---|---|---|
| iii-0 | PET | C | C | A | A | A | A | A | Comparative Example |
|  | Art paper | B | C | A | A | A | A | A | Comparative Example |
| iii-00 | PET | C | C | A | A | A | A | A | Comparative Example |
|  | Art paper | B | C | A | A | A | A | A | Comparative Example |
| iii-000/ii-000 | PET | C | C | A | B | A | A | A | Comparative Example |
|  | Art paper | B | C | A | B | A | A | A | Comparative Example |

As is clear from Tables 9 and 10, an image can be formed promptly without shot droplet interference even in the case where a pigment is used as the colorant of an ink, as in the case where a dye is used as the colorant. This is because the ink further contains a high-boiling point organic solvent recited in the invention. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

Furthermore, containing a pigment as the colorant further improves light resistance and ozone resistance. In addition, this can also provide an image without unevenness, even if the high-boiling point organic solvent, which results in slight unevenness in Example 4 using a dye as the colorant, is contained in the liquid.

Example 6

Images were printed on recording media and evaluated in the same manner as in Example 5, except that the two-liquid-type ink jet recording liquids (iii-1) to (iii-9), (iii-000), (ii-1) to (ii-9) and (ii-000) were used and except that the liquids (ii-1) to (ii-9) and (ii-000) were applied to the recording media with a rod coater (manufactured by (k.k.) Matsubo). Example 6 could provide evaluation results similar to those in Example 5.

Example 7

Preparation of Ink Jet Recording Liquid (VI-1) Containing Polymerizable Compound An ink jet recording liquid (VI-1) was prepared in the same manner as the ink jet recording liquid (I-1) used in Example 1.
<Preparation of Ink Jet Recording Liquid (VII-1) Containing High-Boiling Point Organic Solvent>

An ink jet recording liquid (VII-1) containing a high-boiling point organic solvent recited in the invention was prepared in the same manner as the ink jet recording liquid (II-1) used in Example 1, except that the high-boiling point organic solvent was replaced with the aforementioned specific example (S-9). Here, the amount (weight) of the solvent (S-9) used was the same as the amount (weight) of the solvent (S-6) replaced.
<Preparation of Ink Jet Recording Liquids (VII-2) to (VII-9) Containing High-Boiling Point Organic Solvent>

Ink jet recording liquids (VII-2) to (VII-9) containing a high-boiling point organic solvent recited in the invention were prepared in the same manner as the ink jet recording liquid (VII-1), except that the high-boiling point organic solvent was replaced with each of compounds shown in Table 11. Here, the amount (weight) of each of these solvents was the same as that of the solvent (S-9).

The types of the high-boiling point organic solvents used and the viscosities of each of these high-boiling point organic solvents at 25° C. and 60° C. and the boiling point of each of the high-boiling point organic solvents are shown in Table 11.

TABLE 11

| Liquid | Type of high-boiling point organic solvent | Viscosity (mPa·s) 25° C. | Viscosity (mPa·s) 60° C. | Boiling point (° C.) |
|---|---|---|---|---|
| VII-1 | S-9 | 6.62 | 3.0 | 365 |
| VII-2 | S-6 | 11.7 | 4.0 | 390 |
| VII-3 | S-11 | 10.9 | 3.8 | 400 |
| VII-4 | S-2 | 57.6 | 11.8 | 435 |
| VII-5 | S-102 | 65 | 12.8 | 435 |
| VII-6 | S-105 | 63.2 | 12.6 | — |
| VII-7 | S-12 | 41.1 | 9.0 | — |
| VII-8 | S-4 | 36.2 | 8.2 | — |
| VII-9 | S-108 | 74.4 | 14.3 | — |

It has been confirmed that those whose boiling points are not shown in Table 1 do not boil at 170° C.

<Preparation of One-Liquid-Type Ink Jet Recording Liquid (VI-0) for Comparison>

A magenta ink jet recording liquid (VI-0) was prepared in the same manner as the ink jet recording liquid (I-0) used in Example 1.

<Preparation of One-Liquid-Type Ink Jet Recording Liquid (VI-00) for Comparison>

A magenta ink jet recording liquid (VI-00) was prepared in the same manner as the ink jet recording liquid (I-00) used in Example 1, except that the high-boiling point organic solvent was replaced with the aforementioned specific example (S-9). Here, the amount (weight) of the solvent (S-9) was the same as that of the solvent (S-6). The viscosity of the liquid (VI-00) at 25° C. was 19.6 mPa·s.

<Preparation of Ink Jet Recording Liquid (VII-0) for Comparison Containing High-Boiling Point Organic Solvent>

An ink jet recording liquid (VII-0) for comparison containing a high-boiling point organic solvent was prepared in the same manner as the ink jet recording liquid (VII-1), except that the high-boiling point organic solvent was replaced by liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (S-9) replaced.

<Evaluation>

Images were printed on recording media and evaluated in the same manner as in Example 1, except that the ink jet recording liquids (VI-0), (VII-00), (VI-1), (VII-0) and (VII-1) to (VII-9) were used in place of the ink jet recording liquids (I-0), (I-00), (I-1), (II-0) and (II-1) to (II-9).

The evaluation results are shown in Table 12.

TABLE 12

| Liquid | Recording medium | Line quality | Solid image quality | Feeling of wet | Rubbing resistance | Light resistance | Ozone resistance | Remarks |
|---|---|---|---|---|---|---|---|---|
| VI-1/VII-1 | PET | A | A | A | A | B | B | The Invention |
|  | Art paper | A | A | A | A | B | B | The Invention |
| VI-1/VII-2 | PET | A | A | A | A | B | B | The Invention |
|  | Art paper | A | A | A | A | B | B | The Invention |
| VI-1/VII-3 | PET | A | A | A | A | B | B | The Invention |
|  | Art paper | A | A | A | A | B | B | The Invention |
| VI-1/VII-4 | PET | A | B | A | A | B | B | The Invention |
|  | Art paper | A | B | A | A | B | B | The Invention |
| VI-1/VII-5 | PET | A | B | A | A | B | B | The Invention |
|  | Art paper | A | B | A | A | B | B | The Invention |
| VI-1/VII-6 | PET | A | B | A | A | B | B | The Invention |
|  | Art paper | A | B | A | A | B | B | The Invention |
| VI-1/VII-7 | PET | A | B | A | A | B | B | The Invention |
|  | Art paper | A | B | A | A | B | B | The Invention |
| VI-1/VII-8 | PET | A | B | A | A | B | B | The Invention |
|  | Art paper | A | B | A | A | B | B | The Invention |
| VI-1/VII-9 | PET | A | B | A | A | B | B | The Invention |
|  | Art paper | A | B | A | A | B | B | The Invention |
| VI-0 | PET | C | C | A | A | B | B | Comparative Example |
|  | Art paper | B | C | A | A | B | B | Comparative Example |
| VI-00 | PET | C | C | A | A | B | B | Comparative Example |
|  | Art paper | B | C | A | A | B | B | Comparative Example |
| VI-1/VII-0 | PET | C | C | A | A | B | B | Comparative Example |
|  | Art paper | B | C | A | A | B | B | Comparative Example |

As is clear from Table 12, when the two-liquid-type ink jet recording ink of the invention is used to form an image on a recording medium (i.e., PET sheet or art paper which does not absorb ink), specifically, when one liquid containing at least one polymerizable compound and another liquid containing at least one high-boiling point organic solvent are so jetted as to bring the both liquids into contact with each other on the recording medium, the image formation is promptly conducted on each of the PET sheet and the art paper without shot droplet interference. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

On the other hand, in the case of the samples obtained by jetting one-liquid-type ink, the following has been found. A stable image quality such as no feeling of wet, high rubbing resistance, high light resistance and high ozone resistance can be obtained. However, shot droplet interference appears on the PET sheet or on the art paper, and this one-liquid-type ink has an insufficient image-forming property, and cannot provide an image having high quality.

Similarly, in the case of the two-liquid-type comparative ink, shot droplet interference appears on the PET sheet or on the art paper, and this type of ink has an insufficient image-forming property, and cannot provide an image having high quality.

Example 8

An ink set was prepared and evaluated in the same manner as in Example 7, except that the dye (M-1) was replaced with a pigment, or phthalocyanine. The formulation of a liquid containing the pigment will be shown below.

<Preparation of Ink Jet Recording Liquid (VIII-1) Containing Polymerizable Compound>

An ink jet recording liquid (VIII-1) was prepared in the same manner as the ink jet recording liquid (III-1) used in Example 2.

<Preparation of One-Liquid-Type Ink Jet Recording Liquid (VIII-0) for Comparison>

An ink jet recording liquid (VIII-0) was prepared in the same manner as the ink jet recording liquid (III-0) used in Example 2.

<Preparation of One-Liquid-Type Ink Jet Recording Liquid (VIII-00) for Comparison>

A cyan ink jet recording liquid (VIII-00) was prepared in the same manner as the ink jet recording liquid (III-00) used in Example 2, except that the high-boiling point organic solvent was replaced with the aforementioned specific example (S-9). Here, the amount (weight) of the solvent (S-9) used was the same as the amount (weight) of the solvent (S-6) replaced. The viscosity of the liquid (VIII-00) at 25° C. was 19.8 mPa·s.

Images were printed on recording media and evaluated in the same manner as in Example 7, except that the ink jet recording liquids (VIII-1), (VIII-0), and (VIII-00) were used in place of the ink jet recording liquids (VI-1), (VI-0), and (VI-00). The evaluation results are shown in Table 13.

TABLE 13

| Liquid | Recording medium | Line quality | Solid image quality | Feeling of wet | Rubbing resistance | Light resistance | Ozone resistance | Remarks |
|---|---|---|---|---|---|---|---|---|
| VIII-1/VII-1 | PET | A | A | A | A | A | A | The Invention |
|  | Art paper | A | A | A | A | A | A | The Invention |
| VIII-1/VII-2 | PET | A | A | A | A | A | A | The Invention |
|  | Art paper | A | A | A | A | A | A | The Invention |
| VIII-1/VII-3 | PET | A | A | A | A | A | A | The Invention |
|  | Art paper | A | A | A | A | A | A | The Invention |
| VIII-1/VII-4 | PET | A | A | A | A | A | A | The Invention |
|  | Art paper | A | A | A | A | A | A | The Invention |
| VIII-1/VII-5 | PET | A | A | A | A | A | A | The Invention |
|  | Art paper | A | A | A | A | A | A | The Invention |
| VIII-1/VII-6 | PET | A | A | A | A | A | A | The Invention |
|  | Art paper | A | A | A | A | A | A | The Invention |
| VIII-1/VII-7 | PET | A | A | A | A | A | A | The Invention |
|  | Art paper | A | A | A | A | A | A | The Invention |
| VIII-1/VII-8 | PET | A | A | A | A | A | A | The Invention |
|  | Art paper | A | A | A | A | A | A | The Invention |
| VIII-1/VII-9 | PET | A | A | A | A | A | A | The Invention |
|  | Art paper | A | A | A | A | A | A | The Invention |
| VIII-0 | PET | C | C | A | A | A | A | Comparative Example |
|  | Art paper | B | C | A | A | A | A | Comparative Example |
| VIII-00 | PET | C | C | A | A | A | A | Comparative Example |
|  | Art paper | B | C | A | A | A | A | Comparative Example |
| VIII-1/VII-0 | PET | C | C | A | A | A | A | Comparative Example |
|  | Art paper | B | C | A | A | A | A | Comparative Example |

As is clear from Table 13, an image can be formed promptly without shot droplet interference even in the case where a pigment is used as the colorant of an ink, as in the case where a dye is used as the colorant. This is because the ink further contains a high-boiling point organic solvent recited in the invention. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

Furthermore, containing a pigment as the colorant further improves light resistance and ozone resistance. In addition, this can also provide an image without unevenness, even if the high-boiling point organic solvent, which results in slight unevenness in Example 7 using a dye as the colorant, is contained in the liquid.

Example 9

Images were printed on recording media and evaluated in the same manner as in Example 8, except that the two-liquid-type ink jet recording liquids (VIII-1), (VII-1) to (VII-9) and (VII-0) were used and except that the liquids (VII-1) to (VII-9) and (VII-0) were applied to the recording media with a rod coater (manufactured by (k.k.) Matsubo). Example 9 could provide evaluation results similar to those in Example 8.

Example 10

Preparation of Ink Jet Recording Liquid (XI-1) Containing Polymerizable Compound An ink jet recording liquid (XI-1) was prepared in the same manner as the ink jet recording liquid (I-1) used in Example 1.
<Preparation of Ink Jet Recording Liquid (XII-1) Containing High-Boiling Point Organic Solvent>
An ink jet recording liquid (XII-1) containing a high-boiling point organic solvent recited in the invention was prepared in the same manner as the ink jet recording liquid (II-1) used in Example 1, except that the high-boiling point organic solvent was replaced with the aforementioned specific example (2-2). Here, the amount (weight) of the solvent (2-2) used was the same as the amount (weight) of the solvent (S-6) replaced.
<Preparation of Ink Jet Recording Liquids (XII-2) to (XII-9) Containing High-Boiling Point Organic Solvent>
Ink jet recording liquids (XII-2) to (XII-9) containing a high-boiling point organic solvent recited in the invention were prepared in the same manner as the ink jet recording liquid (XII-1), except that the high-boiling point organic solvent was replaced with each of compounds shown in Table 14. Here, the amount (weight) of each of these solvents used was the same as the amount (weight) of the solvent (2-2) replaced.

The types of the high-boiling point organic solvents used and the viscosities of each of these high-boiling point organic solvents at 25° C. and 60° C. and the boiling point of each of the high-boiling point organic solvents are shown in Table 14.

TABLE 14

| Liquid | Type of high-boiling point organic solvent | Viscosity (mPa·s) 25° C. | 60° C. | Boiling point (° C.) |
|---|---|---|---|---|
| XII-1 | 2-2 | 10.1 | 3.7 | 296 |
| XII-2 | S-20 | 55.7 | 13.1 | 400 |
| XII-3 | S-32 | 8.09 | 3.5 | 345 |
| XII-4 | 2-6 | 8.7 | 3.4 | 340 |
| XII-5 | S-28 | 41.4 | 9.0 | 430 |
| XII-6 | S-34 | 37.5 | 8.4 | 440 |
| XII-7 | 2-23 | 32.5 | 7.6 | 400 |
| XII-8 | 2-31 | 89.9 | 16.6 | 440 |
| XII-9 | S-16 | 62.7 | 11.7 | 400 |

<Preparation of One-Liquid-Type Ink Jet Recording Liquid (XI-0) for Comparison>
A magenta ink jet recording liquid (XI-0) was prepared in the same manner as the ink jet recording liquid (I-0) used in Example 1.
<Preparation of One-Liquid-Type Ink Jet Recording Liquid (XI-00) for Comparison>
A magenta ink jet recording liquid (XI-00) was prepared in the same manner as the ink jet recording liquid (I-00) used in Example 1, except that the high-boiling point organic solvent was replaced with the aforementioned specific example (2-2). Here, the amount (weight) of the solvent (2-2) used was the same as the amount (weight) of the solvent (S-6) replaced. The viscosity of the liquid (XI-00) at 25° C. was 19.6 mPa·s.
<Preparation of Ink Jet Recording Liquid (XII-0) for Comparison Containing High-Boiling Point Organic Solvent>
An ink jet recording liquid (XII-0) for comparison containing a high-boiling point organic solvent was prepared in the same manner as the ink jet recording liquid (XII-1), except that the high-boiling point organic solvent was replaced by liquid paraffin (manufactured by Kanto Chemical Co., Inc., and having a viscosity of 150 mPa·s at 25° C. and a viscosity of 35 mPa·s at 60° C.). Here, the amount (weight) of the liquid paraffin used was the same as the amount (weight) of the solvent (2-2) replaced.
<Evaluation>
Images were printed on recording media and evaluated in the same manner as in Example 1, except that the ink jet recording liquids (XI-0), (XI-00), (XI-1), (XII-0) and (XII-1) to (XII-9) were used in place of the ink jet recording liquids (I-0), (I-00), (I-1), (II-0) and (II-1) to (II-9).

The evaluation results are shown in Table 15.

TABLE 15

| Liquid | Recording medium | Line quality | Solid image quality | Feeling of wet | Rubbing resistance | Light resistance | Ozone resistance | Remarks |
|---|---|---|---|---|---|---|---|---|
| XI-1/XII-1 | PET | A | A | A | A | B | B | The Invention |
|  | Art paper | A | A | A | A | B | B | The Invention |
| XI-1/XII-2 | PET | A | A | A | A | B | B | The Invention |
|  | Art paper | A | A | A | A | B | B | The Invention |
| XI-1/XII-3 | PET | A | A | A | A | B | B | The Invention |
|  | Art paper | A | A | A | A | B | B | The Invention |
| XI-1/XII-4 | PET | A | A | A | A | B | B | The Invention |
|  | Art paper | A | A | A | A | B | B | The Invention |
| XI-1/XII-5 | PET | A | A | A | A | B | B | The Invention |
|  | Art paper | A | A | A | A | B | B | The Invention |

TABLE 15-continued

| Liquid | Recording medium | Line quality | Solid image quality | Feeling of wet | Rubbing resistance | Light resistance | Ozone resistance | Remarks |
|---|---|---|---|---|---|---|---|---|
| XI-1/XII-6 | PET | A | A | A | A | B | B | The Invention |
|  | Art paper | A | A | A | A | B | B | The Invention |
| XI-1/XII-7 | PET | A | A | A | A | B | B | The Invention |
|  | Art paper | A | A | A | A | B | B | The Invention |
| XI-1/XII-8 | PET | A | B | A | A | B | B | The Invention |
|  | Art paper | A | B | A | A | B | B | The Invention |
| XI-1/XII-9 | PET | A | B | A | A | B | B | The Invention |
|  | Art paper | A | B | A | A | B | B | The Invention |
| XI-0 | PET | C | C | A | A | B | B | Comparative Example |
|  | Art paper | B | C | A | A | B | B | Comparative Example |
| XI-00 | PET | C | C | A | A | B | B | Comparative Example |
|  | Art paper | B | C | A | A | B | B | Comparative Example |
| XI-1/XII-0 | PET | C | C | A | A | B | B | Comparative Example |
|  | Art paper | B | C | A | A | B | B | Comparative Example |

As is clear from Table 15, when the two-liquid-type ink jet recording ink of the invention is used to form an image on a recording medium (i.e., PET sheet or art paper which does not absorb ink), specifically, when one liquid containing at least one polymerizable compound and another liquid containing at least one high-boiling point organic solvent are so jetted as to bring the both liquids into contact with each other on the recording medium, the image formation is promptly conducted on each of the PET sheet and the art paper without shot droplet interference. Moreover, it has been found that irradiating the recording medium with ultraviolet rays emitted by a metal halide lamp and having a wavelength of 365 nm at light exposure of 500 mJ/cm² or less in the invention rapidly and efficiently accelerates curing reaction to provide an image having an excellent printing property, no feeling of wet, high rubbing resistance, high light resistance and high ozone resistance.

On the other hand, in the case of the samples obtained by jetting one-liquid-type ink, the following has been found. A stable image quality such as no feeling of wet, high rubbing resistance, high light resistance and high ozone resistance can be obtained. However, shot droplet interference appears on the PET sheet or on the art paper, and this one-liquid-type ink has an insufficient image-forming property, and cannot provide an image having high quality.

Similarly, in the case of the two-liquid-type comparative ink containing a highly viscous solvent, shot droplet interference appears on the PET sheet or on the art paper, and this type of ink has an insufficient image-forming property, and cannot provide an image having high quality.

Example 11

An ink set was prepared and evaluated in the same manner as in Example 10, except that the dye (M-1) was replaced with a pigment, or phthalocyanine. The formulation of a liquid containing the pigment will be shown below.

<Preparation of Ink Jet Recording Liquid (XIII-1) Containing Polymerizable Compound>

An ink jet recording liquid (XIII-1) was prepared in the same manner as the ink jet recording liquid (III-1) used in Example 2.

<Preparation of One-Liquid-Type Ink Jet Recording Liquid (XIII-0) for Comparison>

An ink jet recording liquid (XIII-0) was prepared in the same manner as the ink jet recording liquid (III-0) used in Example 2.

<Preparation of One-Liquid-Type Ink Jet Recording Liquid (XIII-00) for Comparison>

A cyan ink jet recording liquid (XIII-00) was prepared in the same manner as the ink jet recording liquid (III-00) used in Example 2, except that the high-boiling point organic solvent was replaced with the aforementioned specific example (2-2). Here, the amount (weight) of the solvent (2-2) used was the same as the amount (weight) of the solvent (S-6) replaced. The viscosity of the liquid (XIII-00) was 19.6 mPa·s.

Images were printed on recording media and evaluated in the same manner as in Example 10, except that the ink jet recording liquids (XIII-1), (XIII-0), and (XIII-00) were used in place of the ink jet recording liquids (XI-1), (XI-0), and (XI-00). The results are shown in Table 16.

TABLE 16

| Liquid | Recording medium | Line quality | Solid image quality | Feeling of wet | Rubbing resistance | Light resistance | Ozone resistance | Remarks |
|---|---|---|---|---|---|---|---|---|
| XIII-1/XII-1 | PET | A | A | A | A | A | A | The Invention |
|  | Art paper | A | A | A | A | A | A | The Invention |
| XIII-1/XII-2 | PET | A | A | A | A | A | A | The Invention |
|  | Art paper | A | A | A | A | A | A | The Invention |
| XIII-1/XII-3 | PET | A | A | A | A | A | A | The Invention |
|  | Art paper | A | A | A | A | A | A | The Invention |
| XIII-1/XII-4 | PET | A | A | A | A | A | A | The Invention |
|  | Art paper | A | A | A | A | A | A | The Invention |
| XIII-1/XII-5 | PET | A | A | A | A | A | A | The Invention |
|  | Art paper | A | A | A | A | A | A | The Invention |

TABLE 16-continued

| Liquid | Recording medium | Line quality | Solid image quality | Feeling of wet | Rubbing resistance | Light resistance | Ozone resistance | Remarks |
|---|---|---|---|---|---|---|---|---|
| XIII-1/XII-6 | PET | A | A | A | A | A | A | The Invention |
|  | Art paper | A | A | A | A | A | A | The Invention |
| XIII-1/XII-7 | PET | A | A | A | A | A | A | The Invention |
|  | Art paper | A | A | A | A | A | A | The Invention |
| XIII-1/XII-8 | PET | A | A | A | A | A | A | The Invention |
|  | Art paper | A | A | A | A | A | A | The Invention |
| XIII-1/XII-9 | PET | A | A | A | A | A | A | The Invention |
|  | Art paper | A | A | A | A | A | A | The Invention |
| XIII-0 | PET | C | C | A | A | A | A | Comparative Example |
|  | Art paper | B | C | A | A | A | A | Comparative Example |
| XIII-00 | PET | C | C | A | A | A | A | Comparative Example |
|  | Art paper | B | C | A | A | A | A | Comparative Example |
| XIII-1/XII-0 | PET | C | C | A | A | A | A | Comparative Example |
|  | Art paper | B | C | A | A | A | A | Comparative Example |

As is clear from Table 16, an image can be formed promptly without shot droplet interference even in the case where a pigment is used as the colorant of an ink, as in the case where a dye is used as the colorant. This is because the ink further contains a high-boiling point organic solvent recited in the invention. Moreover, it has been found that irradiating the recording medium with ultraviolet rays emitted by a metal halide lamp and having a wavelength of 365 nm at light exposure of 500 mJ/cm$^2$ or less in the invention rapidly and efficiently accelerates curing reaction to provide an image having an excellent printing property, no feeling of wet, high rubbing resistance, high light resistance and high ozone resistance.

Furthermore, containing a pigment as the colorant further improves light resistance and ozone resistance. In addition, this can also provide an image without unevenness, even if the high-boiling point organic solvent, which results in slight unevenness in Example 10 using a dye as the colorant, is contained in the liquid.

Example 12

Images were printed on recording media and evaluated in the same manner as in Example 11, except that the two-liquid-type ink jet recording liquids (XIII-1), (XII-1) to (XII-9) and (XII-0) were used and except that the liquids (XII-1) to (XII-9) and (XII-0) were applied to the recording media with a rod coater (manufactured by (k.k.) Matsubo). Example 12 could provide evaluation results similar to those in Example 11.

The invention claimed is:

1. An ink jet image recording method, the method comprising:
    providing an ink jet recording ink set comprising plural liquids including at least a first liquid and a second liquid; and
    applying the first liquid and the second liquid to a recording medium simultaneously such that both liquids are in contact with each other to form an image; wherein
    the first liquid contains substantially no colorant and substantially no water;
    the first liquid contains a high-boiling point organic solvent which has a viscosity of 100 mPa·s or less at 25° C. or a viscosity of 30 mPa·s or less at 60° C. and a boiling point of 100° C. or higher; and
    the second liquid contains a polymerizable compound and substantially no water.

2. The ink jet image recording method of claim 1, wherein the second liquid is jetted by an ink jet nozzle.

3. The ink jet image recording method of claim 1, wherein the first liquid is jetted by an ink jet nozzle.

4. The ink jet image recording method of claim 1, wherein each of the first liquid and the second liquid is applied by jetting to the recording medium by an ink jet nozzle.

5. The ink jet image recording method of claim 1, the method further comprising fixing an image formed on the recording medium by supplying energy to the image.

6. The ink jet image recording method of claim 5, wherein the energy is supplied by irradiation with light or heating.

7. The ink jet image recording method of claim 1, wherein the first liquid further comprises a polymerization initiator and no polymerizable compound, the polymerization initiator starting curing of the polymerizable compound.

* * * * *